US009973711B2

(12) United States Patent
Yang et al.

(10) Patent No.: US 9,973,711 B2
(45) Date of Patent: May 15, 2018

(54) CONTENT-BASED ZOOMING AND PANNING FOR VIDEO CURATION

(71) Applicant: Amazon Technologies, Inc., Seattle, WA (US)

(72) Inventors: Yinfei Yang, Bellevue, WA (US); William Evan Welbourne, Seattle, WA (US); Ross David Roessler, Seattle, WA (US); Paul Aksenti Savastinuk, Shoreline, WA (US); Cheng-Hao Kuo, Seattle, WA (US); Jim Oommen Thomas, Seattle, WA (US); Tsz Ho Yu, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 116 days.

(21) Appl. No.: 14/753,826

(22) Filed: Jun. 29, 2015

(65) Prior Publication Data

US 2016/0381306 A1    Dec. 29, 2016

(51) Int. Cl.
| G06T 3/40 | (2006.01) |
| H04N 5/262 | (2006.01) |
| G11B 27/031 | (2006.01) |
| G11B 27/06 | (2006.01) |
| H04N 5/232 | (2006.01) |
| G06K 9/00 | (2006.01) |

(52) U.S. Cl.
CPC ....... *H04N 5/2628* (2013.01); *G06K 9/00711* (2013.01); *G06T 3/40* (2013.01); *G11B 27/031* (2013.01); *G11B 27/06* (2013.01); *H04N 5/23238* (2013.01)

(58) Field of Classification Search
CPC ...... H04N 5/2628; G06T 3/40; G11B 27/031; G11B 27/06
USPC ....................... 386/239, 242, 248; 348/36–39
See application file for complete search history.

(56) References Cited

U.S. PATENT DOCUMENTS

2008/0273751 A1* 11/2008 Yuan ........................ G06K 9/32
382/103
2015/0070523 A1* 3/2015 Chao .................. H04N 5/23216
348/218.1

OTHER PUBLICATIONS

International Search Report, dated Sep. 2, 2016, Applicant: Amazon Technologies Inc., 11 pages.

(Continued)

*Primary Examiner* — Mishawn Hunter
(74) *Attorney, Agent, or Firm* — Pierce Atwood LLP

(57) ABSTRACT

Devices, systems and methods are disclosed for identifying content in video data and creating content-based zooming and panning effects to emphasize the content. Contents may be detected and analyzed in the video data using computer vision, machine learning algorithms or specified through a user interface. Panning and zooming controls may be associated with the contents, panning or zooming based on a location and size of content within the video data. The device may determine a number of pixels associated with content and may frame the content to be a certain percentage of the edited video data, such as a close-up shot where a subject is displayed as 50% of the viewing frame. The device may identify an event of interest, may determine multiple frames associated with the event of interest and may pan and zoom between the multiple frames based on a size/location of the content within the multiple frames.

20 Claims, 17 Drawing Sheets

(56) References Cited

OTHER PUBLICATIONS

Feng et al. "Video retargeting: automating pan and scan." In Proceedings of the 14th ACM international conference Multimedia, pp. 241-250. ACM, 2006.

Yasuo et al. "Automatic production system of soccer sports video by digital camera work based on situation recognition." In Eighth IEEE International Symposium on Multimedia (ISM'06), pp. 851-860. IEEE, 2006.

* cited by examiner

US 9,973,711 B2

CONTENT-BASED ZOOMING AND PANNING FOR VIDEO CURATION

BACKGROUND

With the advancement of technology, the use and popularity of electronic devices has increased considerably. Electronic devices are commonly used to capture videos. These videos are sometimes shared with friends and family using online systems, including social networking systems. Disclosed herein are technical solutions to improve the videos that are shared and online systems used to share them.

BRIEF DESCRIPTION OF DRAWINGS

For a more complete understanding of the present disclosure, reference is now made to the following description taken in conjunction with the accompanying drawings.

DETAILED DESCRIPTION

Electronic devices are commonly used to capture image/video data using one or more cameras. While the video data may include a wide field of view in order to capture a wide area, playback of the wide field of view may be static and uninteresting to a viewer. To improve playback of the video data, the video data may be edited to emphasize content within the video data. However, editing the video data is typically performed by a user as there are many subjective elements involved in generating the edited video data.

To automate the video editing process, devices, systems and methods are disclosed that identify contents of the video data and create content-based zooming and panning effects to emphasize the content. For example, contents may be detected and analyzed in the video data using various computer vision or machine learning algorithms or specified through a user interface. The device may associate zooming and panning controls with the contents, determining to zoom or pan based on a location and size of content within the video data. For example, the device may determine a number of pixels associated with the content and may frame the content so that the content is a certain percentage of the edited video data, such as a close-up shot where a subject is displayed as 50% of the viewing frame. Further, the device may identify an event of interest, may determine multiple frames associated with the event of interest and may pan and zoom between the multiple frames based on a size/location of the content within the multiple frames. Examples of an event of interest may include a scoring play in a sporting event or human interaction, such as a greeting or conversation.

Figure 1:
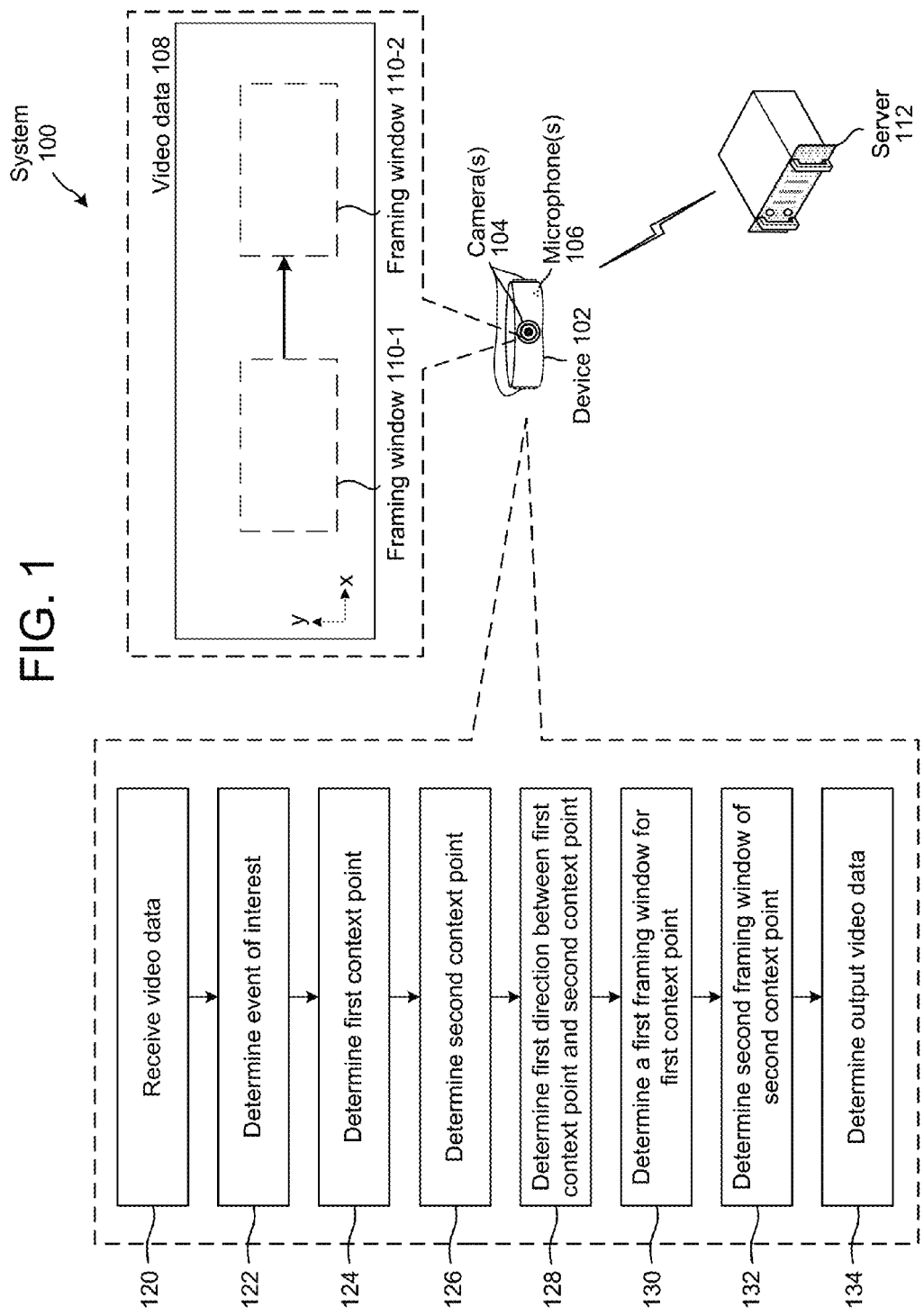
FIG. 1 illustrates an overview of a system for content based zooming and panning according to embodiments of the present disclosure.

FIG. 1 illustrates an overview of a system 100 for implementing embodiments of the disclosure. The system 100 includes a device 102 coupled to camera(s) 104, microphone(s) 106 and a server 112. While the following descriptions refer to the device 102 performing steps illustrated in the drawings, due to computing complexity the server 112 may perform the steps without departing from the present disclosure. As illustrated in FIG. 1, the device 102 may capture video data 108 using the camera(s) 104 and may pan and zoom within the video data 108. For example, the device 102 may determine a first framing window 110-1 associated with a beginning of an event of interest and a second framing window 110-2 associated with an end of the event and may pan/zoom between the first framing window 110-1 and the second framing window 110-2.

The device 102 may receive (120) video data. For example, the device 102 may record panoramic video data using one or more camera(s) 104. As used herein, panoramic video data may include video data having a field of view beyond 180 degrees, which corresponds to video data with an aspect ratio greater than 2:1. However, the present disclosure is not limited thereto and the video data may be any video data from which an output video having smaller dimensions may be generated. While the received video data may be raw video data captured by the one or more camera(s) 104, the present disclosure is not limited thereto. Instead, the received video data may be an edited clip or a video clip generated from larger video data without departing from the present disclosure. For example, a user of the device 102 may identify relevant video clips within the raw video data for the device 102 to edit, such as specifying events of interest or regions of interest within the raw video data. The device 102 may then input the selected portions of the raw video data as the received video data for further editing, such as simulating panning/zooming within the received video data.

The device 102 may determine (122) an event of interest. In some examples, the device 102 may track people and/or objects and determine that the event of interest has occurred based on interactions between the people and/or objects. Faces, human interactions, object interactions or the like may be collectively referred to as content and the device 102 may detect the content to determine the event of interest. For example, two people walking towards each other may exchange a greeting, such as a handshake or a hug, and the device 102 may determine the event of interest occurred based on the two people approaching one another. As another example, the device 102 may be recording a birthday party and may identify a cake being cut or gifts being opened as the event of interest. In some examples, the device 102 may be recording a sporting event and may determine that a goal has been scored or some other play has occurred.

The device 102 may determine (124) a first context point, which may be associated with a time (e.g., image frame) and a location (e.g., x and y pixel coordinates) within the video data 108 (for example a location/coordinates within certain frame(s) of the video data). For example, the first context point may correspond to a beginning of the event (e.g., a first time) and pixels in the video data 108 associated with an object or other content (e.g., a first location) at the first time. Therefore, the device 102 may associate the first context point with first image data (corresponding to the first time) and first pixel coordinates within the first image data (corresponding to the first location) that display the object. The device 102 may determine (126) a second context point, which may also be associated with a time (e.g., image frame) and a location (e.g., x and y coordinates) within the video data 108. For example, the second context point may correspond to an end of the event (e.g., a second time) and pixels in the video data 108 associated with the object (e.g., a second location) at the second time. Therefore, the device 102 may associate the second context point with a second image (corresponding to the second time) and second pixel coordinates within the second image (corresponding to the second location) that display the object.

The device 102 may determine (128) a first direction between the first location of the first context point and the second location of the second context point using the x and y coordinates. For example, the first location may be associated with a first area (e.g., first row of pixels) and the second location may be associated with a second area (e.g., last row of pixels) and the first direction may be in a horizontal direction (e.g., positive x direction). The device 102 may identify the first location using pixel coordinates and may determine the first direction based on the pixel coordinates. For example, if the video data 108 has a resolution of 7680 pixels by 1080 pixels, a pixel coordinate of a bottom left pixel in the video data 108 may have pixel coordinates of (0, 0), a pixel coordinate of a top left pixel in the video data 108 may have pixel coordinates of (0, 1080), a pixel coordinate of a top right pixel in the video data 108 may have pixel coordinates of (7680, 1080) and a bottom right pixel in the video data 108 may have pixel coordinates of (7680, 1080).

The device 102 may determine (130) a first framing window 110-1 associated with the first context point. In some examples, the first framing window 110-1 may include content associated with the event (e.g., a tracked object, person or the like) and may be sized according to a size of the content and the first direction. For example, the content may be a face associated with first pixels having first dimensions and the first direction may be in the horizontal direction (e.g., positive x direction). The device 102 may determine that the content should be included in 50% of the first framing window 110-1 and may therefore determine a size of the framing window 110-1 to have second dimensions twice the first dimensions. As the first direction is in the positive x direction, the device 102 may situate the framing window 110-1 with lead room (e.g., nose room) in the positive x direction from the content. For example, the framing window 110-1 may include the face on the left hand side and blank space on the right hand side to indicate that the output video data will pan to the right.

The video data 108 may be panoramic video data generated using one camera or a plurality of cameras and may have an aspect ratio exceeding 2:1. An aspect ratio is a ratio of one dimension of a video frame to another dimension of a video frame (for example height-width or width-height). For example, a video image having a resolution of 7680 pixels by 1080 pixels corresponds to an aspect ratio of 64:9 or more than 7:1. While the original video data 108 may have a certain aspect ratio (for example 7:1 or other larger than 2:1 ratio) due to a panoramic/360 degree nature of the incoming video data (Which may result from a single panoramic camera or multiple images taken from multiple cameras combined to make a single frame of the video data 108), the resulting video may be set at an aspect ratio that is likely to be used on a viewing device. As a result, an aspect ratio of the framing window 110 may be lower than 2:1. For example, the framing window 110 may have a resolution of 1920 pixels by 1080 pixels (e.g., aspect ratio of 16:9), a resolution of 1140 pixels by 1080 pixels (e.g., aspect ratio of 4:3) or the like. In addition, the resolution and/or aspect ratio of the framing windows 110 may vary based on user preferences. In some examples, a constant aspect ratio is desired (e.g., a 16:9 aspect ratio for a widescreen television) and the resolution associated with the framing windows 110 may vary while maintaining the 16:9 aspect ratio.

The device 102 may determine (132) a second framing window 110-2 associated with the second context point. In some examples, the second framing window 110-2 may include content associated with the event (e.g., a tracked object, person or the like) and may be sized according to a size of the content. Unlike the first framing window 110-1, the second framing window 110-2 may be sized or located with or without regard to the first direction. For example, as the simulated panning ends at the second framing window 110-2, the device 102 may center-weight (i.e., place the content in a center of the frame) the second framing window 110-2 without including lead room.

The device 102 may determine (134) output video data using the first framing window 110-1 and the second framing window 110-2. For example, the output video data may include a plurality of image frames associated with context points and framing windows determined as discussed above with regard to steps 124-132. As illustrated in FIG. 1, the output video data may simulate panning in a left to right direction between the first framing window 110-1 and the second framing window 110-2.

In addition to or instead of outputting video data, the device 102 may output the framing windows as video tags for video editing. For example, the device 102 may determine the framing windows and output the framing windows to the server 112 to perform video summarization on the input video data. The framing windows may be output using video tags, each video tag including information about a size, a location and a timestamp associated with a corresponding framing window. In some examples, the video tags may include pixel coordinates associated with the framing window, while in other examples the video tags may include additional information such as pixel coordinates associated with the object of interest within the framing window or other information determined by the device 102. Using the video tags, the server 112 may generate edited video clips of the input data, the edited video clips simulating the panning and zooming using the framing windows. For example, the server 112 may generate a video summarization including a series of video clips, some of which simulate panning and zooming using the framing windows.

As part of generating the video summarization, the device 102 may display the output video data and may request input from a user of the device 102. For example, the user may instruct the device 102 to generate additional video data (e.g., create an additional video clip), to increase an amount of video data included in the output video data (e.g., change a beginning time and/or an ending time to increase or decrease a length of the output video data), specify an object of interest, specify an event of interest, increase or decrease a panning speed, increase or decrease an amount of zoom or the like. Thus, the device 102 may automatically generate the output video data and display the output video data to the user, may receive feedback from the user and may generate additional or different output video data based on the user input. If the device 102 outputs the video tags, the video tags may be configured to be similarly modified by the user during a video editing process.

As the device 102 is processing the video data after capturing of the video data has ended, the device 102 has access to every video frame included in the video data. Therefore, the device 102 can track objects and people within the video data and may identify context points (e.g., interesting points in time, regions of interest, occurrence of events or the like). After identifying the context points, the device 102 may generate framing windows individually for the context points and may simulate panning and zooming between the context points. For example, the output video data may include portions of the image data for each video frame based on the framing window, and a difference in location and/or size between subsequent framing windows results in panning (e.g., difference in location) and/or zooming (e.g., difference in size). The output video data should therefore include smooth transitions between context points.

The device 102 may generate the output video data as part of a video summarization process. For example, lengthy video data (e.g., an hour of recording) may be summarized in a short video summary (e.g., 2-5 minutes) highlighting the interesting events that occurred in the video data. Therefore, each video clip in the video summary may be relatively short (e.g., between 5-60 seconds) and panning and zooming may be simulated to provide context for the video clip (e.g., the event). For example, the device 102 may determine that an event occurs at a first video frame and may include 5 seconds prior to the first video frame and 5 seconds following the first video frame, for a total of a 10 second video clip.

After generating a first video summarization, the device 102 may receive feedback from a user to generate a second video summarization. For example, the first video summarization may include objects and/or people that the user instructs the device 102 to exclude in the second video summarization. In addition, the user may identify objects and/or people to track and emphasize in the second video summarization. Therefore, the device 102 may autonomously generate the first video summarization and then generate the second video summarization based on one-time user input instead of direct user control.

The device 102 may identify and/or recognize content within the video data using facial recognition, object recognition, sensors included within objects or clothing, computer vision or the like. For example, the computer vision may scan image data and identify a soccer ball, including pixel coordinates and dimensions associated with the soccer ball. Based on a sporting event template, the device 102 may generate a framing window for the soccer ball such that pixels associated with the soccer ball occupy a desired percentage of the framing window. For example, if the dimensions associated with the soccer ball are (x, y) and the desired percentage of the framing window is 50%, the device 102 may determine that dimensions of the framing window are (2x, 2y).

The device 102 may store a database of templates and may determine a relevant template based on video data of an event being recorded. For example, the device 102 may generate and store templates associated with events like a party (e.g., a birthday party, a wedding reception, a New Year's Eve party, etc.), a sporting event (e.g., a golf template, a football template, a soccer template, etc.) or the like. A template may include user preferences and/or general settings associated with the event being recorded to provide parameters within which the device 102 processes the video data. For example, if the device 102 identifies a golf club and a golf course in the video data, the device 102 may use a golf template and may identify golf related objects (e.g., a tee, a green, hazards and a flag) within the video data. Using the golf template, the device 102 may use relatively large framing windows to simulate a wide field of view to include the golf course. In contrast, if the device 102 identifies a birthday cake, gifts or other birthday related objects in the video data, the device 102 may use a birthday template and may identify a celebrant, participants and areas of interest (e.g., a gift table, a cake or the like) within the video data. Using the birthday template, the device 102 may use relatively small framing windows to simulate a narrow field of view to focus on individual faces within the video data. Various other templates may be trained by the system, for example using machine learning techniques and training data to train the system as to important or non-important objects/events in various contexts.

When panning between context points (e.g., framing windows), an amount of pan/zoom may be based on a size of the content within the framing window. For example, a wider field of view can pan more quickly without losing context, whereas a narrow field of view may pan relatively slowly. Thus, a velocity and/or acceleration of the pan/zoom may be limited to a ceiling value based on the template selected by the device 102 and/or user input. For example, the device 102 may use an acceleration curve to determine the velocity and/or acceleration of the pan/zoom and may limit the acceleration curve to a ceiling value. The ceiling value may be an upper limit on the velocity and/or acceleration to prevent a disorienting user experience, but the device 102 does not receive a low limit on the velocity and/or acceleration.

The velocity, acceleration, field of view, panning preferences, zooming preferences or the like may be stored as user preferences or settings associated with templates. Various machine learning techniques may be used to determine the templates, user preferences, settings and/or other functions of the system described herein. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques. Many different training examples may be used during training. For example, video data from similar events may be processed to determine shared characteristics of the broadcasts and the characteristics may be saved as "ground truth" for the training examples. For example, machine learning techniques may be used to analyze golf broadcasts and determine characteristics associated with a golf template.

Figure 2:
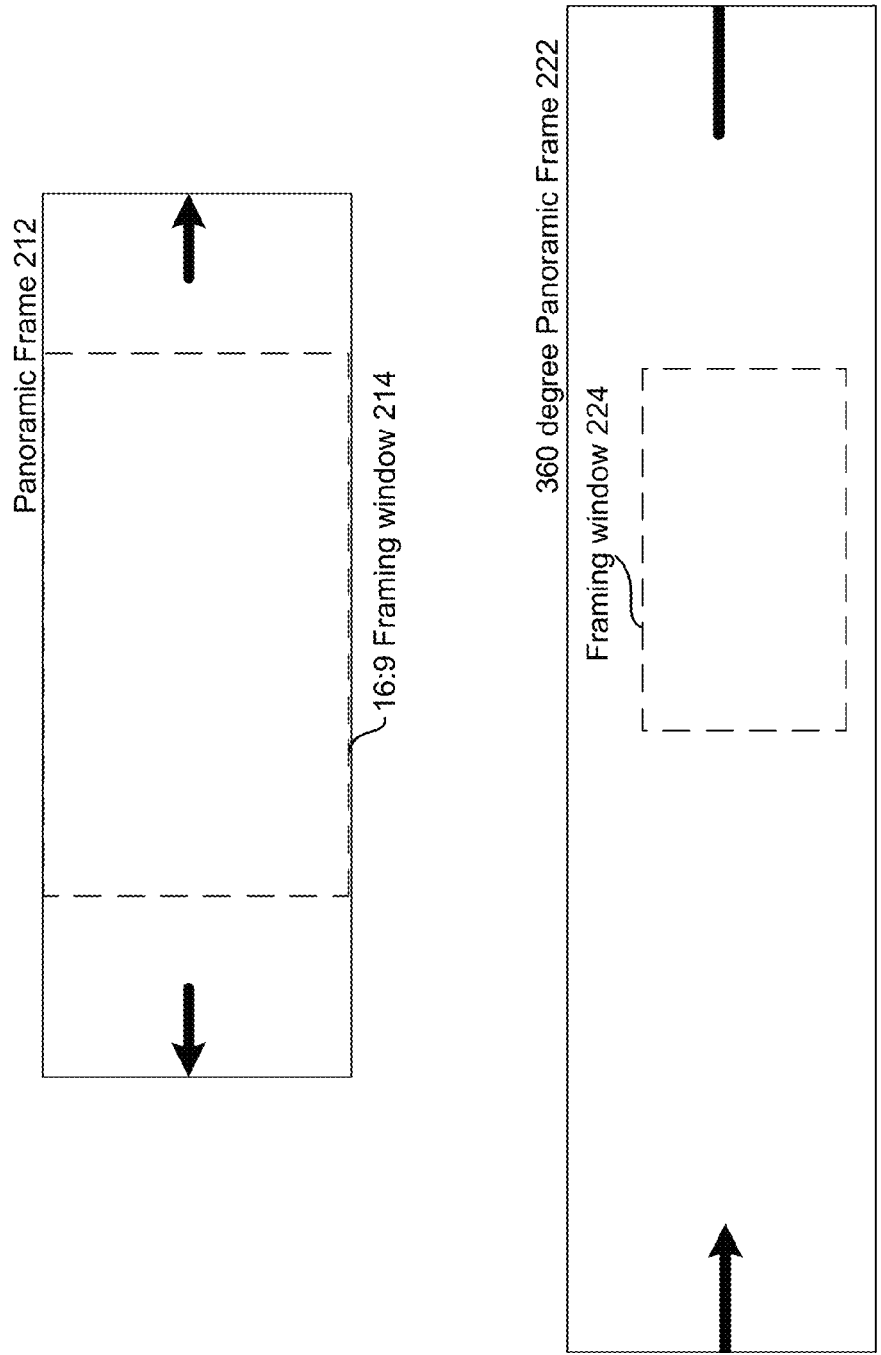
FIG. 2 illustrates examples of panoramic video data according to embodiments of the present disclosure.

FIG. 2 illustrates examples of panoramic video data according to embodiments of the present disclosure. As discussed above, the video data may include panoramic video data having a field of view above 180 degrees and/or an aspect ratio exceeding 2:1. However, the present disclosure is not limited thereto and may include any video data, for example video data having a field of view beyond what is normally displayed using a 16:9 aspect ratio on a television. For example, FIG. 2 illustrates a panoramic frame 212 extending beyond a 16:9 framing window 214. In contrast, 360 degree panoramic frame 222 extends beyond the normal 16:9 frame and includes content in all directions, as illustrated by the arrow wrapping around from a right edge to a left edge of the 360 degree panoramic frame 222. The panoramic frame 212 and/or the 360 degree panoramic fame 222 may be generated using one camera or a plurality of cameras without departing from the present disclosure.

While the device 102 may capture video data such as the 360 degree panoramic frame 222, the device 102 may determine framing windows, such as framing window 224, for each frame of the video data. By selecting the framing windows for each frame of the video data, the device 102 may effectively crop the video data and generate output video data using a 16:9 aspect ratio (e.g., viewable on high definition televisions without horizontal black bars) that emphasizes the content within the framing windows. However, the present disclosure is not limited to a 16:9 aspect ratio and the aspect ratio may vary.

Figure 3:
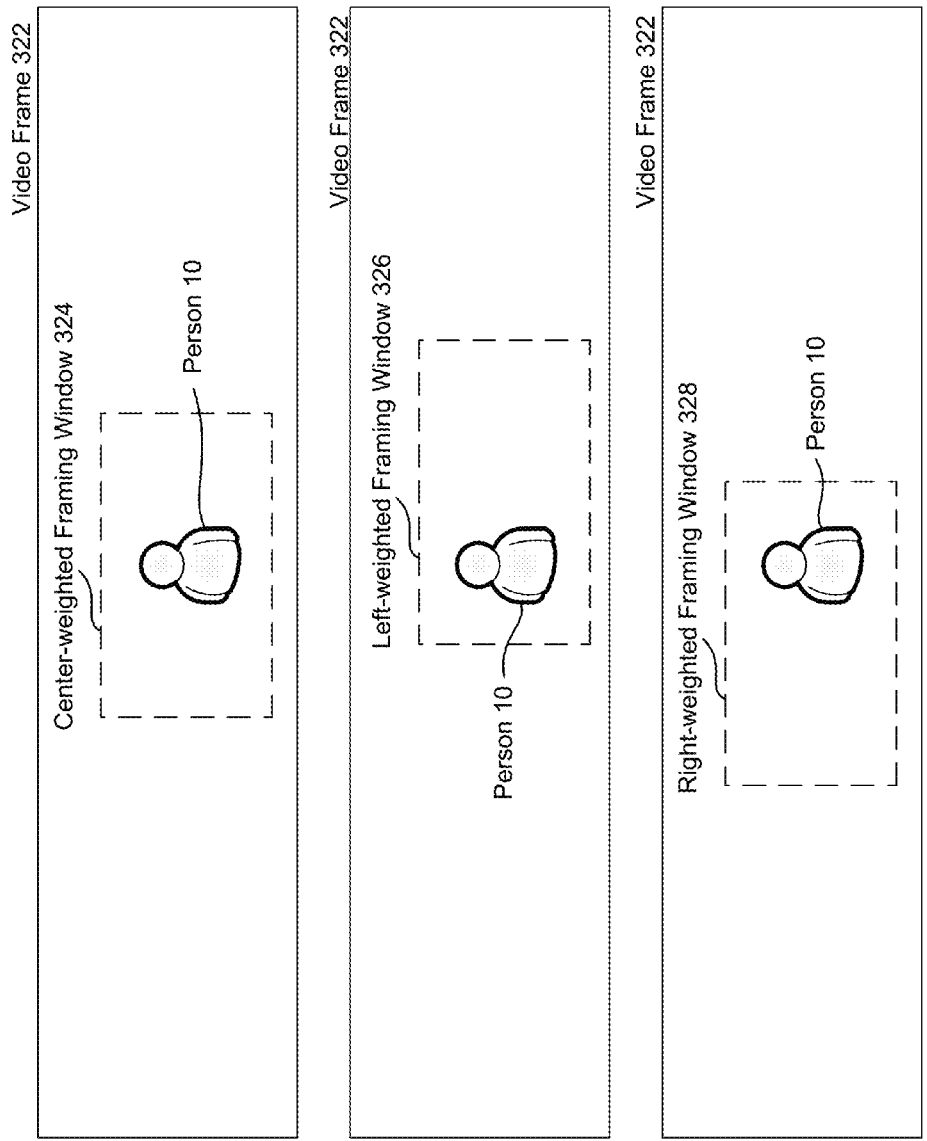
FIG. 3 illustrates examples of framing windows according to embodiments of the present disclosure.

FIG. 3 illustrates examples of framing windows according to embodiments of the present disclosure. As illustrated in FIG. 3, the device 102 may generate multiple framing windows from a single video frame 322. For example, a center-weighted framing window 324 may be centered on a person 10 in the video frame 322, such that there is an equal distance (in the x direction) from either edge of the center-weighted framing window 324 to the person 10. In contrast, a left-weighted framing window 326 may be offset in the video frame 322 such that a left edge of the left-weighted framing window 326 is closer (in the x direction) to the person 10 than a right edge, with empty space (e.g., negative space) situated to the right of the person 10. The left-weighted framing window 326 may be used when there is a second subject to the right of the person 10 or if the device 102 is panning to the right from the person 10. Similarly, a right-weighted framing window 328 may be offset in the video frame 322 such that a right edge of the right-weighted framing window 328 is closer (in the x direction) to the person 10 than a left edge, with empty space (e.g., negative space) situated to the left of the person 10. The right-weighted framing window 328 may be used when there is a second subject to the left of the person 10 or if the device 102 is panning to the left from the person 10.

While FIG. 3 illustrates framing windows weighted in reference to an x axis, the present disclosure is not limited thereto. Instead, the device 102 may weight framing windows with reference to a y axis or both the x axis and the y axis without departing from the present disclosure.

As used hereinafter, for ease of explanation a "framing window" may be referred to as a "cropped window" in reference to the output video data. For example, a video frame may include image data associated with the video data 108 and the device 102 may determine a framing window within the image data associated with a cropped window. Thus, the cropped window may include a portion of the image data and dimensions of the cropped window may be smaller than dimensions of the video frame, in some examples significantly smaller. The output video data may include a plurality of cropped windows, effectively cropping the video data 108 based on the framing windows determined by the device 102.

Figure 4:
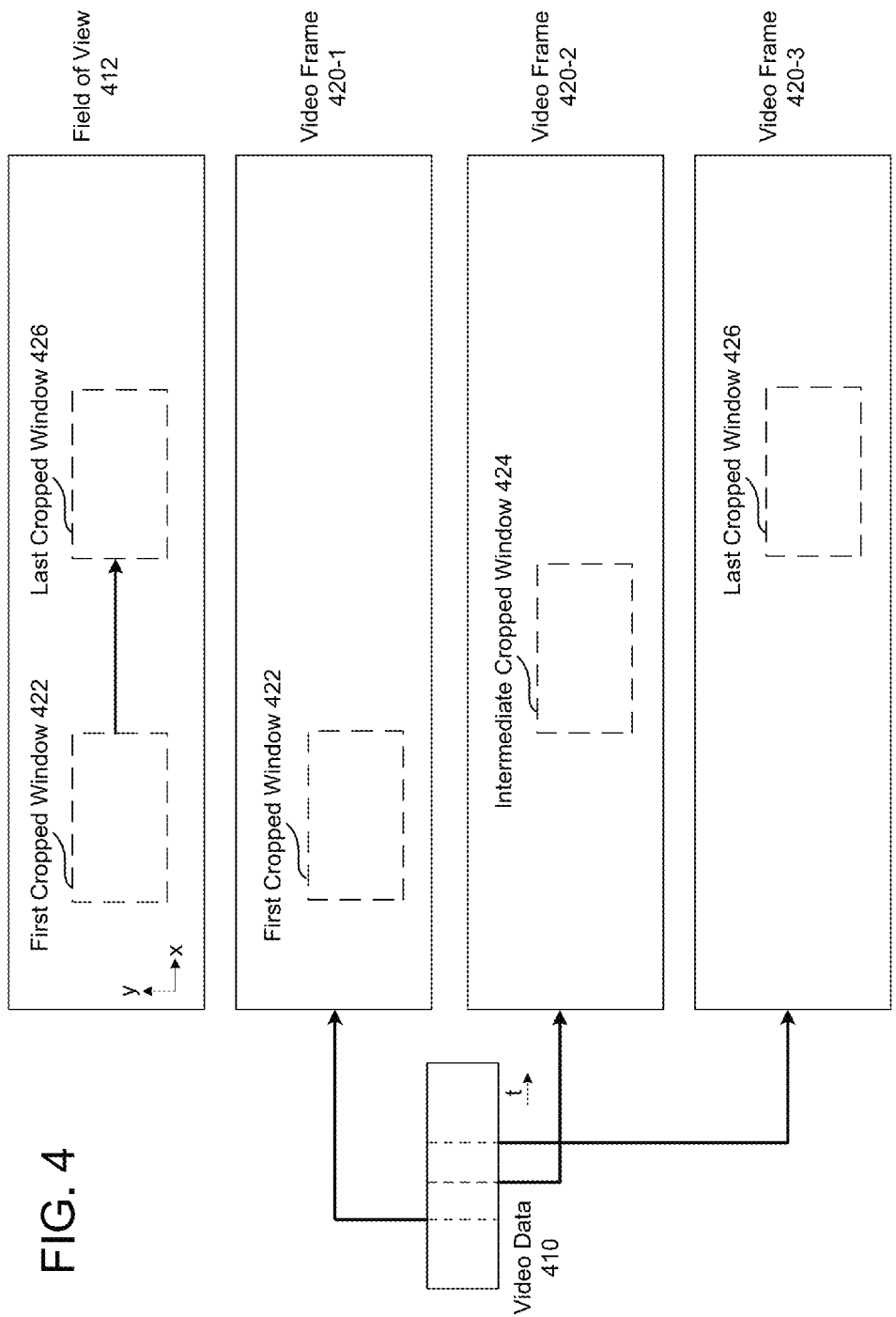
FIG. 4 illustrates an example of panning according to embodiments of the present disclosure.

FIG. 4 illustrates an example of panning according to embodiments of the present disclosure. As illustrated in FIG. 4, the device 102 may pan from a first cropped window 422 to a last cropped window 426 within a field of view 412 associated with video data 410. For example, the field of view 412 may include a plurality of pixels in an x and y array, such that each pixel is associated with x and y coordinates of the video data 410. A first video frame 420-1 includes first image data associated with a first time, a second video frame 420-2 includes second image data associated with a second time and a third video frame 420-3 includes third image data associated with a third time. To simulate panning, the device 102 may determine a first cropped window 422 in the first video frame 420-1, an intermediate cropped window 424 in the second video frame 420-2 and a last cropped window 426 in the third video frame 420-3.

As illustrated in FIG. 4, the simulated panning travels in a horizontal direction (e.g., positive x direction) from a first location of the first cropped window 422 through a second location of the intermediate cropped window 424 to a third location of the last cropped window 426. Therefore, the simulated panning extends along the x axis without vertical movements in the output video data. Further, as dimensions of the first cropped window 422 are equal to dimensions of the intermediate cropped window 424 and the last cropped window 426, the output video data generated by the device 102 will pan from left to right without zooming in or out.

While FIG. 4 illustrates a single intermediate cropped window 424 between the first cropped window 422 and the last cropped window 426, the disclosure is not limited thereto and the output video data may include a plurality of intermediate cropped windows without departing from the present disclosure.

Figure 5:
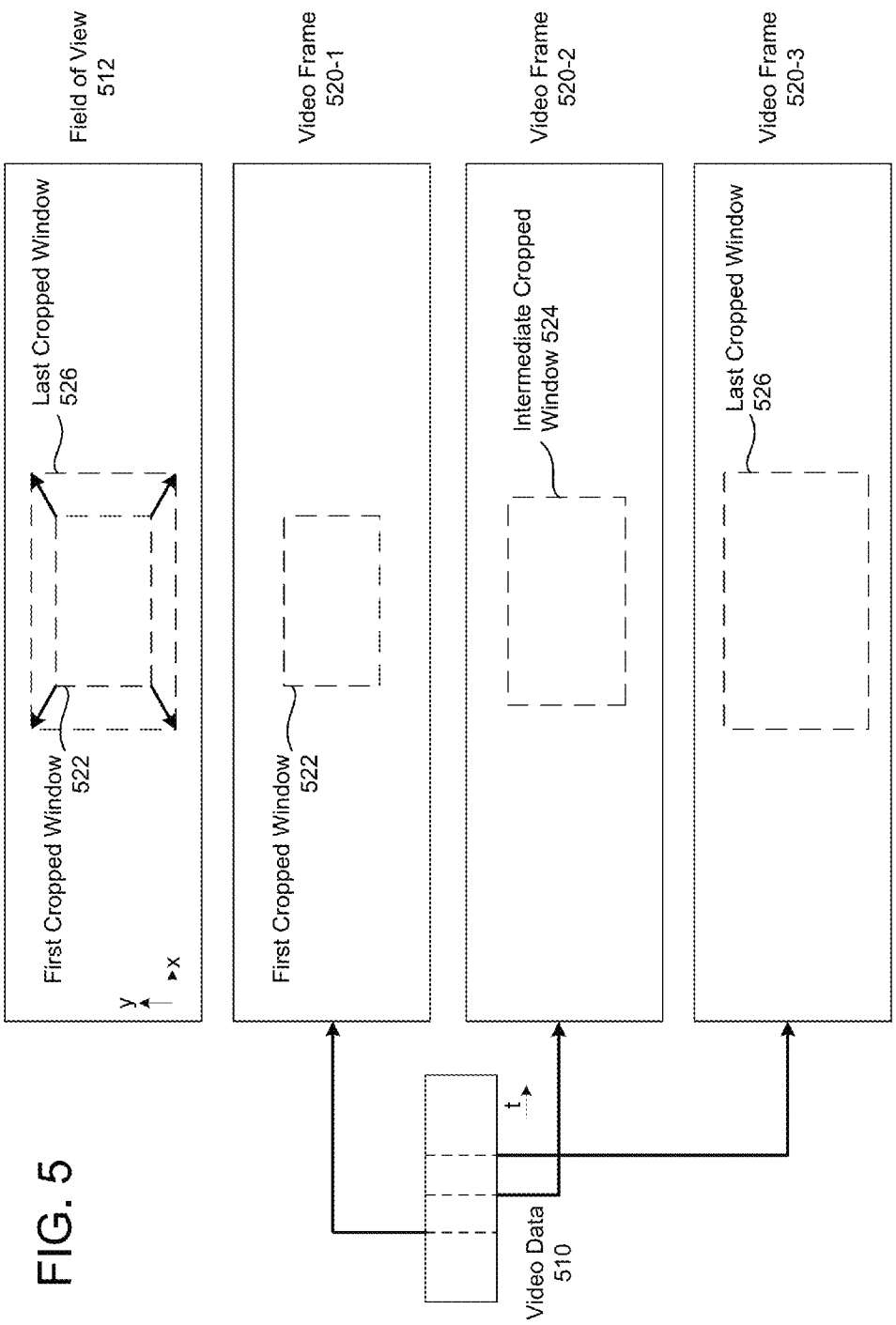
FIG. 5 illustrates an example of dynamic zooming according to embodiments of the present disclosure.

FIG. 5 illustrates an example of zooming according to embodiments of the present disclosure. As illustrated in FIG. 5, the device 102 may zoom from a first cropped window 522 to a last cropped window 526 within a field of view 512 associated with video data 510. For example, the field of view 512 may include a plurality of pixels in an x and y array, such that each pixel is associated with x and y coordinates of the video data 510. A first video frame 520-1 includes first image data associated with a first time, a second video frame 520-2 includes second image data associated with a second time and a third video frame 520-3 includes third image data associated with a third time. To simulate zooming, the device 102 may determine a first cropped window 522 in the first video frame 520-1, an intermediate cropped window 524 in the second video frame 520-2 and a last cropped window 526 in the third video frame 520-3.

As illustrated in FIG. 5, the simulated zooming increases horizontal and vertical dimensions (e.g., x and y dimensions) from first dimensions of the first cropped window 522 through second dimensions of the intermediate cropped window 524 to third dimensions of the last cropped window 526. Therefore, the output video data generated by the device 102 will zoom out without panning left or right, such that the last cropped window 526 may appear to include more content than the first cropped window 522. As will be discussed in greater detail below with regard to FIG. 11, the device 102 may determine an amount of magnification of the content within the framing window, such determining dimensions of the framing window so that the content is included in 50% of the framing window. In some examples, the device 102 may determine the amount of magnification without exceeding a threshold magnification and/or falling below a minimum resolution. For example, the device 102 may determine a minimum number of pixels that may be included in the cropped windows to avoid pixilation or other image degradation. Therefore, the device 102 may determine the minimum resolution based on user preferences or settings and/or pixel coordinates associated with an object/event of interest and may determine a size of the cropped windows to exceed the minimum resolution.

While FIG. 5 illustrates a single intermediate cropped window 524 between the first cropped window 522 and the last cropped window 526, the disclosure is not limited thereto and the output video data may include a plurality of intermediate cropped windows without departing from the present disclosure.

Figure 6:
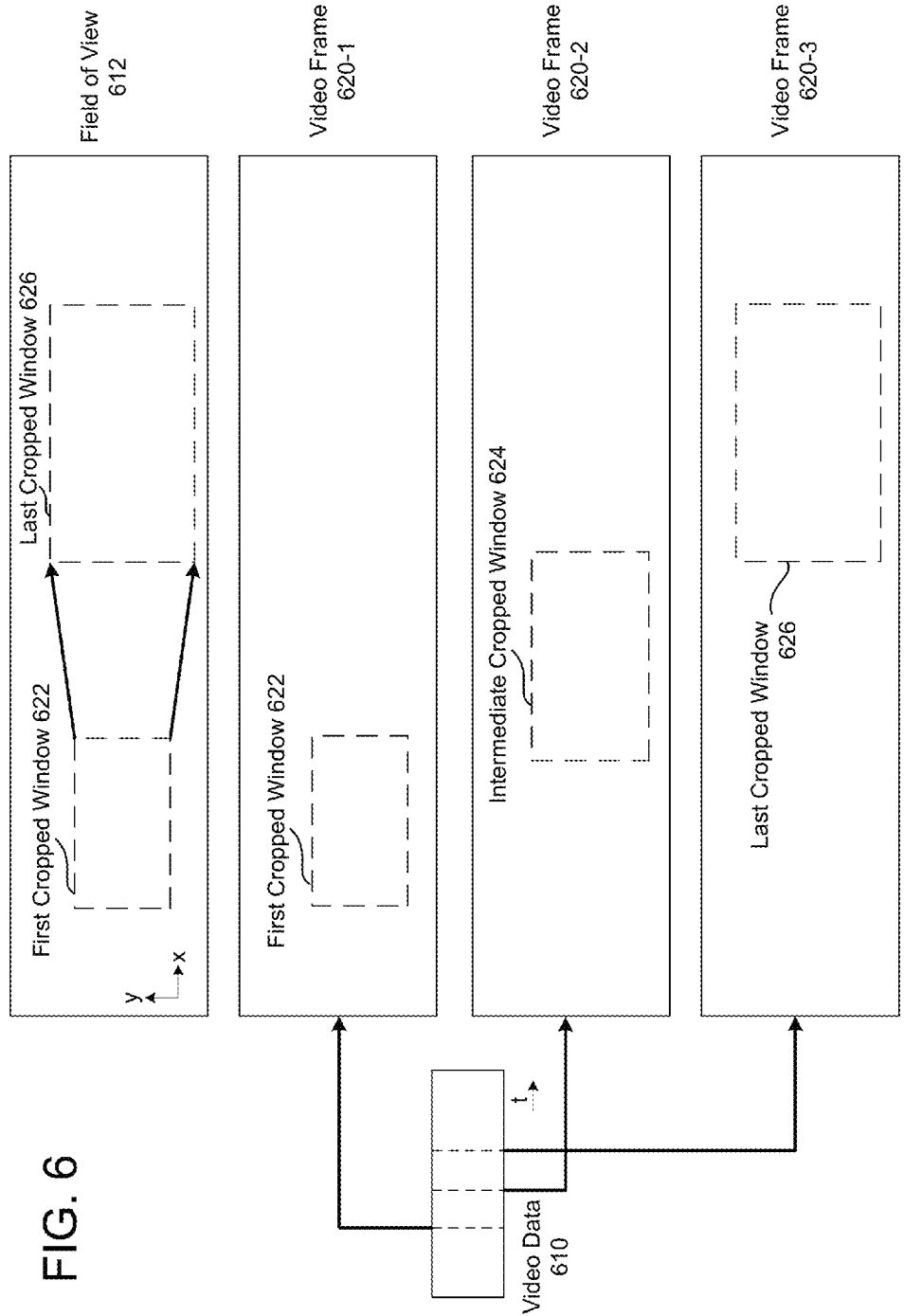
FIG. 6 illustrates an example of panning and zooming according to embodiments of the present disclosure.

FIG. 6 illustrates an example of panning and zooming according to embodiments of the present disclosure. As illustrated in FIG. 6, the device 102 may pan and zoom from a first cropped window 622 to a last cropped window 626 within a field of view 612 associated with video data 610. For example, the field of view 612 may include a plurality of pixels in an x and y array, such that each pixel is associated with x and y coordinates of the video data 610. A first video frame 620-1 includes first image data associated with a first time, a second video frame 620-2 includes second image data associated with a second time and a third video frame 620-3 includes third image data associated with a third time. To simulate both panning and zooming, the device 102 may determine a first cropped window 622 in the first video frame 620-1, an intermediate cropped window 624 in the second video frame 620-2 and a last cropped window 626 in the third video frame 620-3.

As illustrated in FIG. 6, the device 102 simulates panning by moving in a horizontal direction (e.g., positive x direction) between the first cropped window 622, the intermediate cropped window 624 and the last cropped window 626. Similarly, the device 102 simulates zooming by increasing horizontal and vertical dimensions (e.g., x and y dimensions) from first dimensions of the first cropped window 622 through second dimensions of the intermediate cropped window 624 to third dimensions of the last cropped window 626. Therefore, the output video data generated by the device 102 will zoom out while panning to the right, such that the last cropped window 626 may appear to include more content than the first cropped window 622 and may be associated with a location to the right of the first cropped window 622. While FIG. 6 illustrates a single intermediate cropped window 624 between the first cropped window 622 and the last cropped window 626, the disclosure is not limited thereto and the output video data may include a plurality of intermediate cropped windows without departing from the present disclosure.

Figure 7:
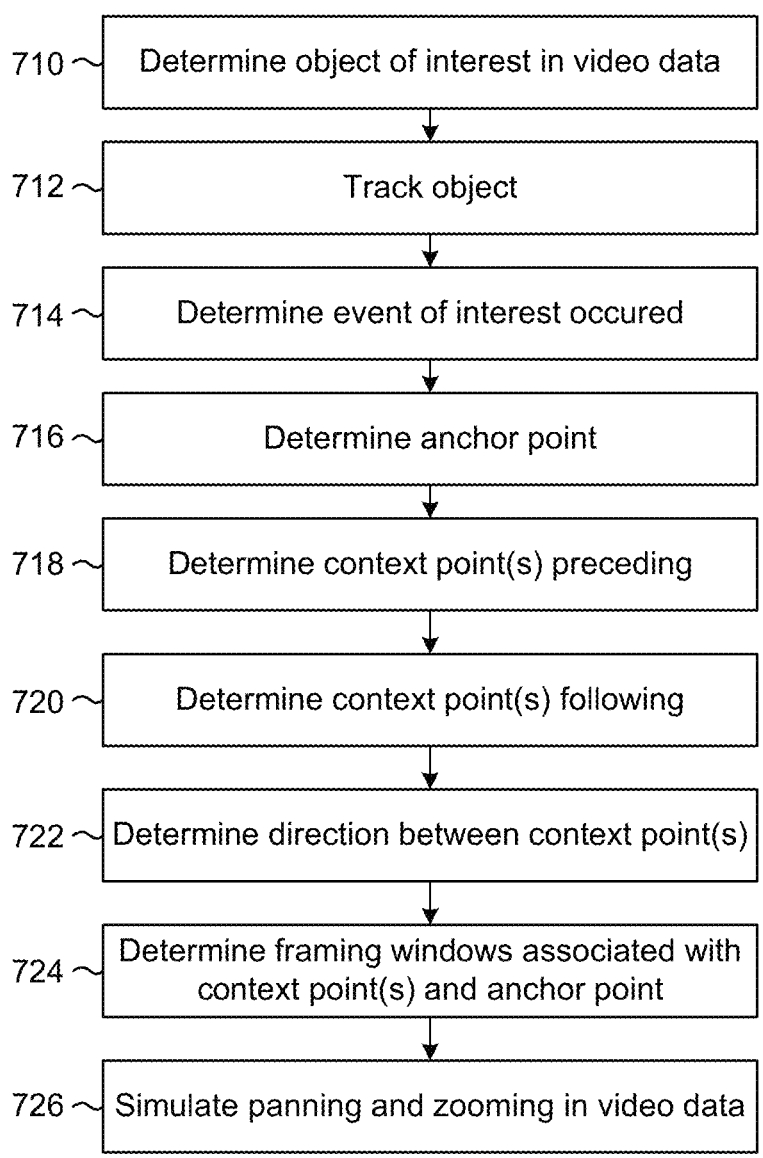
FIG. 7 is a flowchart conceptually illustrating an example method for simulating panning and zooming according to embodiments of the present disclosure.

FIG. 7 is a flowchart conceptually illustrating an example method for simulating panning and zooming according to embodiments of the present disclosure. The device 102 may determine (710) an object of interest included in video data and may track (712) the object within the video data. For example, the device 102 may track an object (e.g., a soccer ball, a football, a birthday cake or the like), a person (e.g., a face using facial recognition) or the like throughout multiple video frames. The device 102 may track the object using a sensor (e.g., RFID tag within the object or wearable by a person), using computer vision to detect the object within the video data or the like.

The device 102 may determine (714) that an event of interest occurred based on tracking the object and may determine (716) an anchor point associated with the event of interest. For example, the device 102 may determine that a goal is scored in a sporting event and may determine the anchor point is a reference image associated with the goal being scored (e.g., the soccer ball crossing the plane of a goal). Alternatively, the device 102 may determine an event based on two objects approaching one another, such as two humans approaching each other (e.g., in a sporting event or during a greeting), a person approaching an object (e.g., a soccer player running towards a ball), an object approaching a person (e.g., a football being thrown at a receiver) or the like, and may determine the anchor point is a reference image associated with the two objects approaching one another. However, the present disclosure is not limited thereto and the device 102 may determine that the event of interest occurred using other methods. For example, the device 102 may determine that an event of interest occurred based on video tags associated with the video data, such as a video tag input by a user to the device 102 indicating an important moment in the video data.

The device 102 may determine (718) context point(s) preceding the anchor point in time and determine (720) context point(s) following the anchor point in time. For example, the device 102 may identify the tracked object in video frames prior to the anchor point and may associate the tracked object in the video frames with preceding context point(s) in step 718. Similarly, the device 102 may identify the tracked object in video frames following the anchor point and may associated the tracked object in the video frames with following context point(s) in step 720. Examples of determining context point(s) will be discussed in greater detail below with regard to FIGS. 8-10.

The device 102 may determine (722) a direction between context point(s). For example, the device 102 may determine a first direction between first pixel coordinates associated with a first context point and second pixel coordinates associated with a subsequent second context point. The device 102 may determine (724) framing windows associated with context point(s) and the anchor point based on the context point (or anchor point) and the direction between subsequent context points. For example, as discussed above with regard to FIG. 3, the device 102 may frame the first context point off-center to include room to pan along the first direction to the second context point. The device 102 may simulate (726) panning and zooming in video data using the context point(s) and the anchor point. For example, the device 102 may generate output video data including portions of the input video data associated with the framing windows.

The video data 108 may be panoramic video data generated using one camera or a plurality of cameras and may have an aspect ratio exceeding 2:1 (e.g., a resolution of 7680 pixels by 1080 pixels corresponds to an aspect ratio of 64:9 or more than 7:1). In contrast, an aspect ratio of the framing windows may be lower than 2:1. For example, the framing windows may have a resolution of 1920 pixels by 1080 pixels (e.g., aspect ratio of 16:9), a resolution of 1140 pixels by 1080 pixels (e.g., aspect ratio of 4:3) or the like. In addition, the resolution and/or aspect ratio of the framing windows may vary based on user preferences. In some examples, a constant aspect ratio is desired (e.g., a 16:9 aspect ratio for a widescreen television) and the resolution associated with the framing windows may vary while maintaining the 16:9 aspect ratio.

In addition to or instead of outputting video data, the device 102 may output the framing windows as video tags for video editing. For example, the device 102 may determine the framing windows and output the framing windows to an external device to perform video summarization on the input video data. The framing windows may be output using video tags, each video tag including information about a size, a location and a timestamp associated with a corresponding framing window. In some examples, the video tags may include pixel coordinates associated with the framing window, while in other examples the video tags may include additional information such as pixel coordinates associated with the object of interest within the framing window or other information determined by the device 102. Using the video tags, the external device may generate edited video clips of the input data, the edited video clips simulating the panning and zooming using the framing windows. For example, the external device may generate a video summarization including a series of video clips, some of which simulate panning and zooming using the framing windows.

Figure 8:
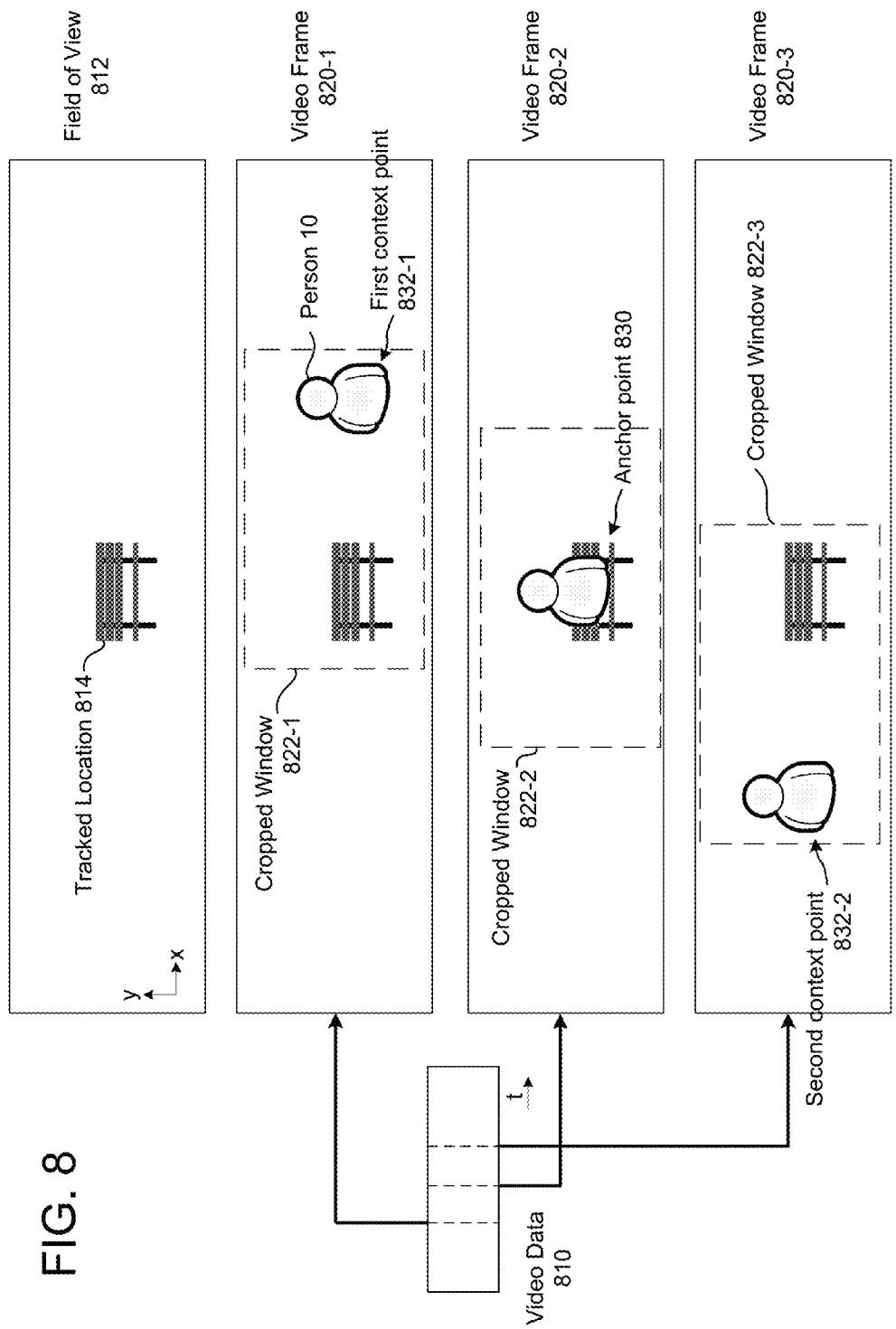
FIG. 8 illustrates an example of tracking a location according to embodiments of the present disclosure.

FIG. 8 illustrates an example of tracking a location according to embodiments of the present disclosure. As illustrated in FIG. 8, the device 102 may track a tracked location 814 (e.g., a bench) within the field of view 812 associated with video data 810. A first video frame 820-1 includes first image data associated with a first time, a second video frame 820-2 includes second image data associated with a second time and a third video frame 820-3 includes third image data associated with a third time. As the device 102 is processing the video data 810 after capturing of the video data 810 has ended, the device 102 has access to every video frame included in the video data 810. Thus, the device 102 may determine an anchor point associated with an event of interest and then determine a first context point preceding the anchor point and a second context point following the anchor point. The anchor point, the first context point and the second context point may be associated with a time (e.g., video frame) and a location (e.g., a plurality of pixels having x and y coordinates) within the video data 108. For example, the first context point may be associated with pixel coordinates in the first video frame 820-1, the anchor point may be associated with pixel coordinates in the second video frame 820-2 and the second context point may be associated with pixel coordinates in the third video frame 820-3.

To determine that the event of interest occurred, the device 102 may track the tracked location 814 and determine if any identifiable content (e.g., face, person, object or the like) move in proximity to the tracked location 814. For example, the device 102 may determine that the person 10 is in proximity to the tracked location 814 (e.g., person 10 is sitting on the bench) in the second video frame 820-2. The device 102 may determine that the event occurred based on a distance between the person 10 and the tracked location 814 being below a threshold and may therefore determine an anchor point 830 associated with pixel coordinates of the person 10 on the bench (e.g., location) in the second video frame 820-2 (e.g., time).

After determining the anchor point 830, the device 102 may determine the first context point 832-1 preceding the anchor point. To determine the first context point 832-1, the device 102 may determine when the person 10 is first in proximity to the tracked location 814 or may determine a fixed duration prior to the anchor point 830. As a first example, the first context point 832-1 may correspond to the person 10 being in proximity to the tracked location 814 when a distance between the person 10 and the tracked location 814 is below a second threshold. As the first threshold is being used to determine that an event occurred, the second threshold is used to determine when the event began and is therefore larger than the first threshold. In the first example, the first context point 832-1 may occur at any time prior to the anchor point 830 and may vary depending on multiple variables. Therefore, the output video data may provide context for how the person 10 arrived near the tracked location 814. As a second example, the first context point 832-1 may correspond to the fixed duration prior to the anchor point 830, such as a period of 5 or 10 seconds before the second video frame 820-2. As the fixed duration is constant, the first context point 832-1 corresponds to the first video frame 820-1 regardless of a location of the person 10. In the second example, the output video data may provide a lead-in time prior to the anchor point 830.

Similarly, the device 102 may determine the second context point 832-2 following the anchor point. To determine the second context point 832-2, the device 102 may determine when the person 10 is last in proximity to the tracked location 814 subsequent to the anchor point 830 or may determine a fixed duration following the anchor point 830. As a first example, the second context point 832-2 may correspond to the person 10 moving out of proximity to the tracked location 814 when a distance between the person 10 and the tracked location 814 exceeds the second threshold. In the first example, the second context point 832-2 may occur at any time following the anchor point 830 and may vary depending on multiple variables. Therefore, the output video data may provide context for how the person 10 left the tracked location 814. As a second example, the second context point 832-2 may correspond to the fixed duration following the anchor point 830, such as a period of 5 or 10 seconds after the second video frame 820-2. As the fixed duration is constant, the second context point 832-2 corresponds to the third video frame 820-3 regardless of a location of the person 10. In the second example, the output video data may including a period of time following the anchor point 830.

As illustrated in FIG. 8, the device 102 may determine a first cropped window 822-1 including a portion of the first video frame 820-1, where first dimensions of the first cropped window 822-1 may be based on the first context point 832-1 such that the first cropped window 822-1 includes the person 10 and/or the tracked location 814. The device 102 may determine a second cropped window 822-2 including a portion of the second video frame 820-2, where second dimensions of the second cropped window 822-2 may be based on the anchor point 830 such that the second cropped window 822-2 includes the person 10 and/or the tracked location 814. The device 102 may determine a third cropped window 822-3 including a portion of the third video frame 820-3, where third dimensions of the third cropped window 822-3 may be based on the second context point 832-2 such that the third cropped window 822-3 includes the person 10 and/or the tracked location 814. In some examples, the first dimensions, the second dimensions and/or the third dimensions may be different, resulting in the output video data simulating zooming between the first cropped window 822-1 and the third cropped window 822-3. As illustrated in FIG. 8, however, the first dimensions, second dimensions and third dimensions are equal, resulting in the output video data simulating panning from right to left between the first cropped window 822-1 and the third cropped window 822-3.

While FIG. 8 illustrates the cropped windows 822 including the person 10 and the tracked location 814, the present disclosure is not limited thereto. Instead, each of the cropped windows 822 may emphasize one of the person 10 and the tracked location 814 without departing from the present disclosure. Alternatively, as discussed in greater detail below with regard to FIG. 14, the output video data may include the person 10 and the tracked location 814 using picture in picture. The device 102 may determine which of the person 10 and/or the tracked location 814 to emphasize using at least one trained machine learning model and settings associated with a template. Further, while FIG. 8 illustrates a single first context point 832-1 preceding the anchor point 830 and a single second context point 832-2 following the anchor point 830, the present disclosure is not limited thereto. Instead, the output video data may include a plurality of context points 832 without departing from the present disclosure.

Figure 9:
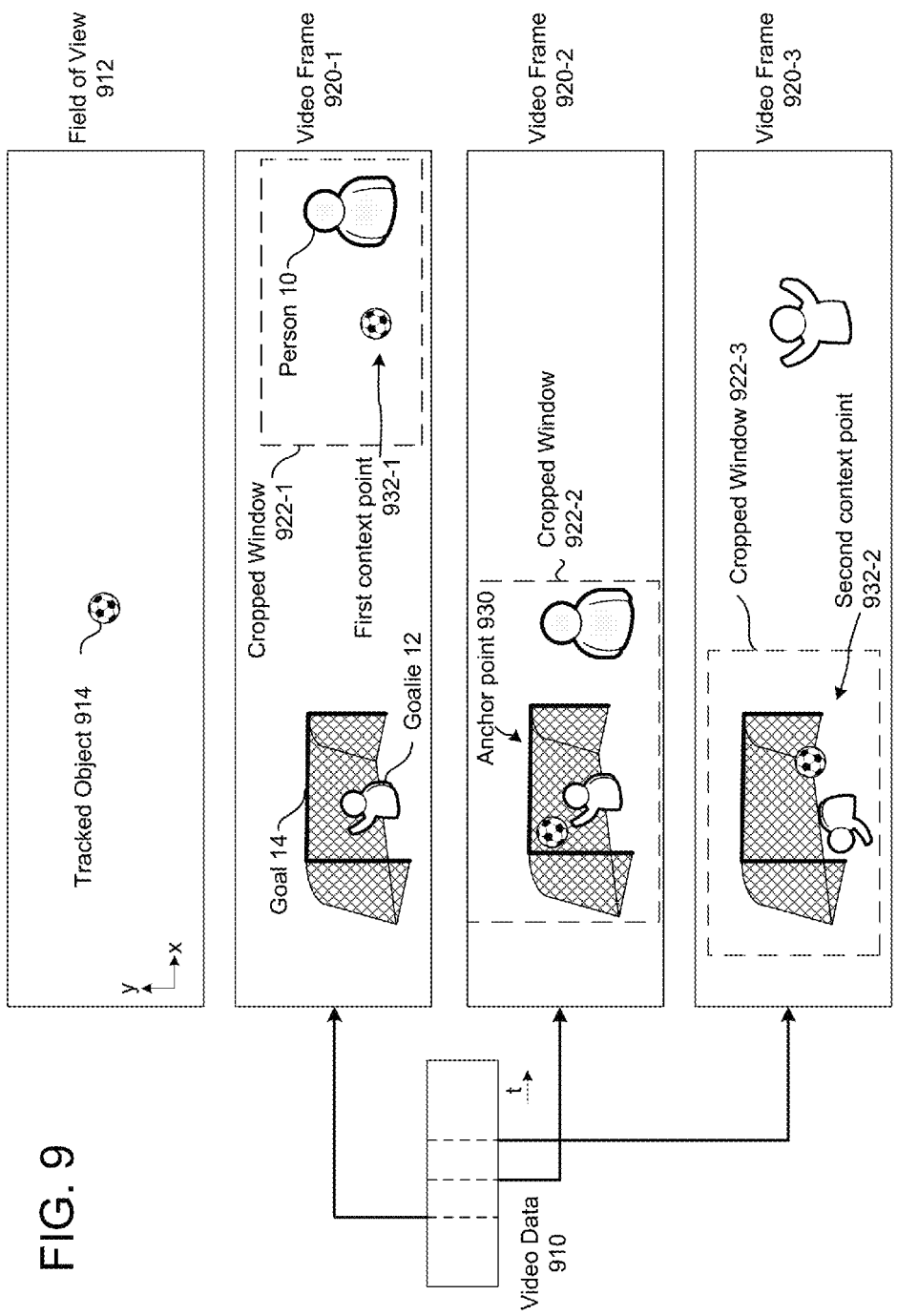
FIG. 9 illustrates an example of tracking an object according to embodiments of the present disclosure.

FIG. 9 illustrates an example of tracking an object according to embodiments of the present disclosure. The device 102 may track the object using a sensor (e.g., RFID tag within the object), using computer vision to detect the object within the video data or the like. As illustrated in FIG. 9, the device 102 may track a tracked object 914 (e.g., a soccer ball) within the field of view 912 associated with video data 910. A first video frame 920-1 includes first image data associated with a first time, a second video frame 920-2 includes second image data associated with a second time and a third video frame 920-3 includes third image data associated with a third time. As the device 102 is processing the video data 910 after capturing of the video data 910 has ended, the device 102 has access to every video frame included in the video data 910. Thus, the device 102 may determine an anchor point associated with an event of interest and then determine a first context point preceding the anchor point and a second context point following the anchor point. The anchor point, the first context point and the second context point may be associated with a time (e.g., video frame) and a location (e.g., a plurality of pixels having x and y coordinates) within the video data 108. For example, the first context point may be associated with pixel coordinates in the first video frame 920-1, the anchor point may be associated with pixel coordinates in the second video frame 920-2 and the second context point may be associated with pixel coordinates in the third video frame 920-3.

To determine that the event of interest occurred, the device 102 may track the tracked object 914 and determine if the tracked object 914 interacts with any identifiable content (e.g., face, person, object, goal or the like). For example, the device 102 may determine if the tracked object 914 goes out of bounds, scores a goal, is passed between multiple players or other actions associated with the game of soccer. The device 102 may determine that an event occurred based on user preferences, such as when the soccer ball goes out of bounds or scores a goal. As illustrated in FIG. 9 the event is scoring a goal, so the device 102 may determine that the event occurred when the tracked object 914 is in proximity to a goal 14 (e.g., a distance between the tracked object 914 and the goal 14 is below a threshold). The device 102 may therefore determine an anchor point 930 associated with pixel coordinates of the tracked object 914 and/or goal 14 (e.g., location) in the second video frame 920-2 (e.g., time).

After determining the anchor point 930, the device 102 may determine the first context point 932-1 preceding the anchor point. To determine the first context point 932-1, the device 102 may determine when the tracked object 914 is first in proximity to the goal 14 or may determine a fixed duration prior to the anchor point 930. As a first example, the first context point 932-1 may correspond to the tracked object 914 being in proximity to the goal 14 when a distance between the tracked object 914 and the goal 14 is below a second threshold. As the first threshold is being used to determine that an event occurred, the second threshold is used to determine when the event began and is therefore larger than the first threshold. In the first example, the first context point 932-1 may occur at any time prior to the anchor point 930 and may vary depending on multiple variables. Therefore, the output video data may provide context for how the tracked object 914 arrived near the goal 14. As a second example, the first context point 932-1 may correspond to the fixed duration prior to the anchor point 930, such as a period of 5 or 10 seconds before the second video frame 920-2. As the fixed duration is constant, the first context point 932-1 corresponds to the first video frame 920-1 regardless of a location of the tracked object 914. In the second example, the output video data may provide a lead-in time prior to the anchor point 930.

Similarly, the device 102 may determine the second context point 932-2 following the anchor point. To determine the second context point 932-2, the device 102 may determine when the tracked object 914 is last in proximity to the goal 14 subsequent to the anchor point 930 or may determine a fixed duration following the anchor point 930. As a first example, the second context point 932-2 may correspond to the tracked object 914 moving out of proximity to the goal 14 when a distance between the tracked object 914 and the goal 14 exceeds the second threshold. In the first example, the second context point 932-2 may occur at any time following the anchor point 930 and may vary depending on multiple variables. Therefore, the output video data may provide context for how the tracked object 914 left the goal 14. As a second example, the second context point 932-2 may correspond to the fixed duration following the anchor point 930, such as a period of 5 or 10 seconds after the second video frame 920-2. As the fixed duration is constant, the second context point 932-2 corresponds to the third video frame 920-3 regardless of a location of the tracked object 914. In the second example, the output video data may including a period of time following the anchor point 930.

As illustrated in FIG. 9, the device 102 may determine a first cropped window 922-1 including a portion of the first video frame 920-1, where first dimensions of the first cropped window 922-1 may be based on the first context point 932-1 such that the first cropped window 922-1 includes the person 10 and/or the tracked object 914. The device 102 may determine a second cropped window 922-2 including a portion of the second video frame 920-2, where second dimensions of the second cropped window 922-2 may be based on the anchor point 930 such that the second cropped window 922-2 includes the person 10, the tracked object 914, the goalie 12 and/or the goal 14. FIG. 9 is not to scale and the second cropped window 922-2 may include more content in the vertical direction, such as a crowd and a stadium. The device 102 may determine a third cropped window 922-3 including a portion of the third video frame 920-3, where third dimensions of the third cropped window 922-3 may be based on the second context point 932-2 such that the third cropped window 922-3 includes the tracked object 914, the goalie 12 and/or the goal 14. As the device 102 is tracking the tracked object 914, the third cropped window 922-3 includes the tracked object 914 instead of a celebration by the person 10. In some examples, the first dimensions, second dimensions and third dimensions are equal, resulting in the output video data simulating panning from right to left between the first cropped window 922-1 and the third cropped window 922-3. As illustrated in FIG. 9, however, the first dimensions, the second dimensions and the third dimensions are different, resulting in the output video data simulating panning and zooming between the first cropped window 922-1 and the third cropped window 922-3.

While FIG. 9 illustrates the cropped windows 922 including two or more of the person 10, the tracked object 914, the goalie 12 and the goal 14, the present disclosure is not limited thereto. Instead, each of the cropped windows 922 may emphasize one of the person 10, the tracked object 914, the goalie 12 and the goal 14 without departing from the present disclosure. Alternatively, as discussed in greater detail below with regard to FIG. 14, the output video data may include two or more of the person 10, the tracked object 914, the goalie 12 and the goal 14 using picture in picture. The device 102 may determine which of the person 10, the tracked object 914, the goalie 12 and/or the goal 14 to emphasize using at least one trained machine learning model and settings associated with a template.

While FIG. 9 illustrates a first context point 932-1 preceding the anchor point 930 and a second context point 932-2 following the anchor point 930, the present disclosure is not limited thereto. Instead, the output video data may include a plurality of context points 932 without departing from the present disclosure. For example, the device 102 may determine an additional context point associated with a reaction of the goalie 12 or a reaction of the crowd cheering after the goal is scored and may display the reaction of the goalie 12 and/or the reaction of the crowd in addition to the context points illustrated in FIG. 9. While not illustrated in FIG. 9, the device 102 may generate non-linear output video data. For example, the output video data may include a first video clip of the event (e.g., the goal scoring) from a first perspective (e.g., the response of the goalie 12) followed by a second video clip of the event from a second perspective (e.g., the response of the crowd) without departing from the present disclosure.

Figure 10:
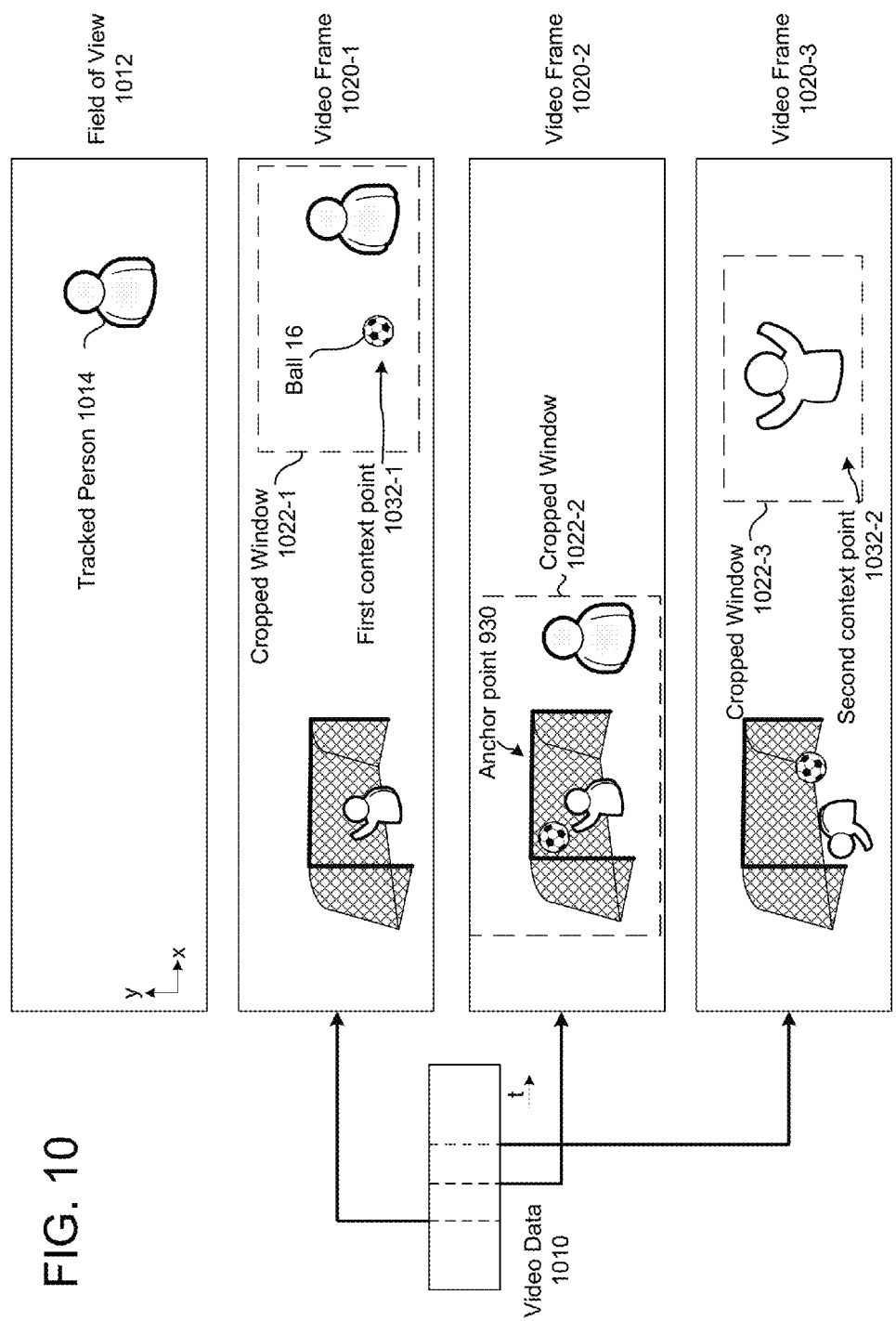
FIG. 10 illustrates an example of tracking a person according to embodiments of the present disclosure.

FIG. 10 illustrates an example of tracking a person according to embodiments of the present disclosure. The device 102 may track the person using a sensor (e.g., RFID tag in clothing worn by the person), using computer vision to detect the person within the video data (e.g., facial recognition) or the like. As illustrated in FIG. 10, the device 102 may track a tracked person 1014 (e.g., a soccer player) within the field of view 1012 associated with video data 1010. A first video frame 1020-1 includes first image data associated with a first time, a second video frame 1020-2 includes second image data associated with a second time and a third video frame 1020-3 includes third image data associated with a third time. As the device 102 is processing the video data 1010 after capturing of the video data 1010 has ended, the device 102 has access to every video frame included in the video data 1010. Thus, the device 102 may determine an anchor point associated with an event of interest and then determine a first context point preceding the anchor point and a second context point following the anchor point. The anchor point, the first context point and the second context point may be associated with a time (e.g., video frame) and a location (e.g., a plurality of pixels having x and y coordinates) within the video data 108. For example, the first context point may be associated with pixel coordinates in the first video frame 1020-1, the anchor point may be associated with pixel coordinates in the second video frame 1020-2 and the second context point may be associated with pixel coordinates in the third video frame 1020-3.

To determine that the event of interest occurred, the device 102 may track the tracked person 1014 and determine if the tracked person 1014 interacts with any identifiable content (e.g., ball, person, object, goal or the like). For example, the device 102 may determine if the tracked person 1014 passes the ball 16, shoots the ball 16, collides with another player or other actions associated with the game of soccer. The device 102 may determine that an event occurred based on user preferences, such as when the tracked person 1014 shoots the ball 16. As illustrated in FIG. 10 the event is shooting on a goal 14, so the device 102 may determine that the event occurred when the tracked person 1014 kicks the ball 16 towards the goal 14 and a distance between the ball 16 and the goal 14 is below a first threshold. The device 102 may therefore determine an anchor point 1030 associated with pixel coordinates of the tracked person 1014, ball 16 and/or goal 14 (e.g., location) in the second video frame 1020-2 (e.g., time).

After determining the anchor point 1030, the device 102 may determine the first context point 1032-1 preceding the anchor point. To determine the first context point 1032-1, the device 102 may determine when the tracked person 1014 is first in proximity to the goal 14 or may determine a fixed duration prior to the anchor point 1030. As a first example, the first context point 1032-1 may correspond to the tracked person 1014 being in proximity to the goal 14 when a distance between the tracked person 1014 and the goal 14 is below a second threshold. As the first threshold is being used to determine that an event occurred, the second threshold is used to determine when the event began and is therefore larger than the first threshold. In the first example, the first context point 1032-1 may occur at any time prior to the anchor point 1030 and may vary depending on multiple variables. Therefore, the output video data may provide context for how the tracked person 1014 arrived near the goal 14. As a second example, the first context point 1032-1 may correspond to the fixed duration prior to the anchor point 1030, such as a period of 5 or 10 seconds before the second video frame 1020-2. As the fixed duration is constant, the first context point 1032-1 corresponds to the first video frame 1020-1 regardless of a location of the tracked person 1014. In the second example, the output video data may provide a lead-in time prior to the anchor point 1030.

Similarly, the device 102 may determine the second context point 1032-2 following the anchor point. To determine the second context point 1032-2, the device 102 may determine when the tracked person 1014 and/or ball 16 are last in proximity to the goal 14 subsequent to the anchor point 1030 or may determine a fixed duration following the anchor point 1030. As a first example, the second context point 1032-2 may correspond to the tracked person 1014 moving out of proximity to the goal 14 when a distance between the tracked person 1014 and the goal 14 exceeds the second threshold. In the first example, the second context point 1032-2 may occur at any time following the anchor point 1030 and may vary depending on multiple variables. Therefore, the output video data may provide context for how the tracked person 1014 left the goal 14. As a second example, the second context point 1032-2 may correspond to the fixed duration following the anchor point 1030, such as a period of 5 or 10 seconds after the second video frame 1020-2. As the fixed duration is constant, the second context point 1032-2 corresponds to the third video frame 1020-3 regardless of a location of the tracked person 1014. In the second example, the output video data may including a period of time following the anchor point 1030.

As illustrated in FIG. 10, the device 102 may determine a first cropped window 1022-1 including a portion of the first video frame 1020-1, where first dimensions of the first cropped window 1022-1 may be based on the first context point 1032-1 such that the first cropped window 1022-1 includes the person 10 and/or the tracked person 1014. The device 102 may determine a second cropped window 1022-2 including a portion of the second video frame 1020-2, where second dimensions of the second cropped window 1022-2 may be based on the anchor point 1030 such that the second cropped window 1022-2 includes the person 10, the tracked person 1014, the goalie 12 and/or the goal 14. FIG. 10 is not to scale and the second cropped window 1022-2 may include more content in the vertical direction, such as a crowd and a stadium. The device 102 may determine a third cropped window 1022-3 including a portion of the third video frame 1020-3, where third dimensions of the third cropped window 1022-3 may be based on the second context point 1032-2 such that the third cropped window 1022-3 includes the tracked person 1014. As the device 102 is tracking the tracked person 1014, the third cropped window 1022-3 includes a celebration by the tracked person 1014 instead of a reaction of the goalie 12. In some examples, the first dimensions, second dimensions and third dimensions are equal, resulting in the output video data simulating panning from right to left between the first cropped window 1022-1 and the third cropped window 1022-3. As illustrated in FIG. 10, however, the first dimensions, the second dimensions and the third dimensions are different, resulting in the output video data simulating panning and zooming between the first cropped window 1022-1 and the third cropped window 1022-3.

While FIG. 10 illustrates the cropped windows 1022 including two or more of the tracked person 1014, the goalie 12, the goal 14 and the ball 16, the present disclosure is not limited thereto. Instead, each of the cropped windows 1022 may emphasize one of the tracked person 1014, the goalie 12, the goal 14 and the ball 16 without departing from the present disclosure. Alternatively, as discussed in greater detail below with regard to FIG. 14, the output video data may include two or more of the tracked person 1014, the goalie 12, the goal 14 and the ball 16 using picture in picture. The device 102 may determine which of the tracked person 1014, the goalie 12, the goal 14 and/or the ball 16 to emphasize using at least one trained machine learning model and settings associated with a template.

While FIG. 10 illustrates a first context point 1032-1 preceding the anchor point 1030 and a second context point 1032-2 following the anchor point 1030, the present disclosure is not limited thereto. Instead, the output video data may include a plurality of context points 1032 without departing from the present disclosure. For example, the device 102 may determine an additional context point associated with a reaction of the goalie 12 or a reaction of the crowd cheering after the goal is scored and may display the reaction of the goalie 12 and/or the reaction of the crowd in addition to the context points illustrated in FIG. 10. While not illustrated in FIG. 10, the device 102 may generate non-linear output video data. For example, the output video data may include a first video clip of the event (e.g., the goal scoring) from a first perspective (e.g., the response of the goalie 12) followed by a second video clip of the event from a second perspective (e.g., the response of the crowd) without departing from the present disclosure.

Figure 11:
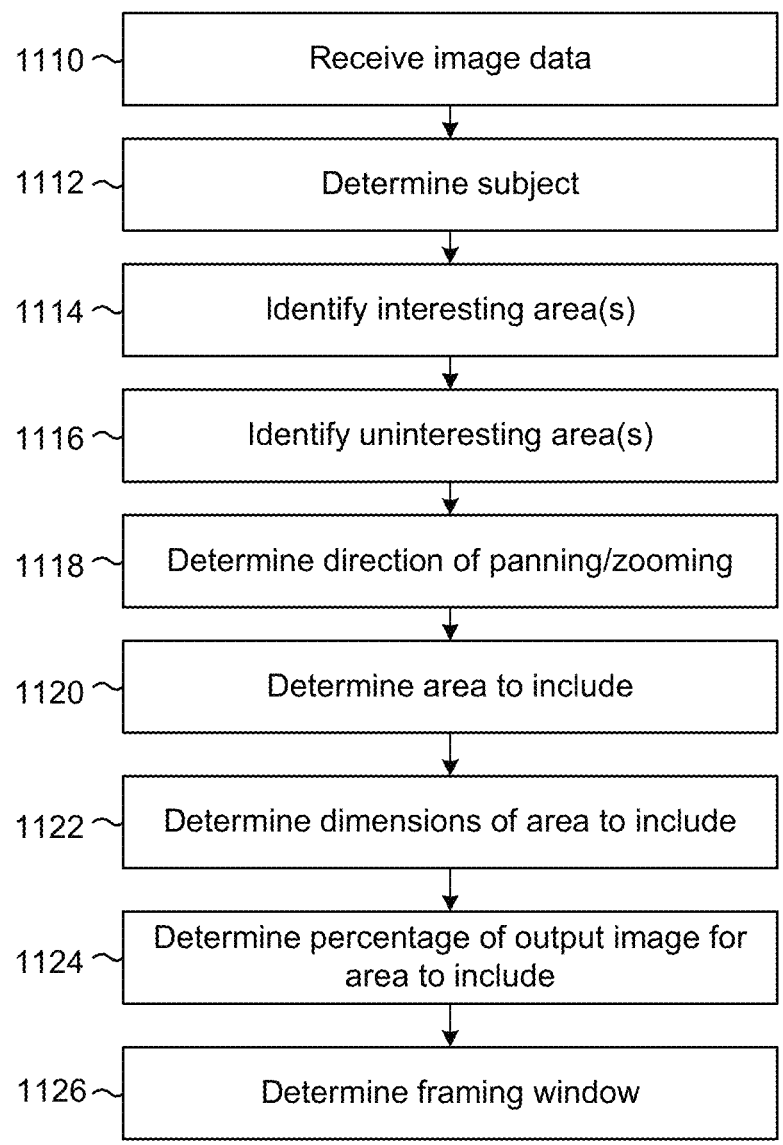
FIG. 11 is a flowchart conceptually illustrating an example method for determining a framing window according to embodiments of the present disclosure.

FIG. 11 is a flowchart conceptually illustrating an example method for determining a framing window according to embodiments of the present disclosure. The device 102 may receive (1110) image data and may determine (1112) a subject. For example, the device 102 may determine the subject as discussed above with regard to tracking objects and determining anchor points/context points. The device 102 may identify (1114) interesting area(s) neighboring the subject and may identify (1116) uninteresting areas neighboring the subject. For example, the device 102 may identify interesting areas based on dynamic content (e.g., face, object, person or the like associated with movement), content associated with the subject (e.g., if the subject is a soccer ball, interesting areas may include a soccer goal or a goalie) or the like. The device 102 may identify uninteresting areas based on static content (e.g., pixel data remaining relatively static for a period of time) or based on user input (e.g., user input identifies a face as a caterer serving an event).

The device 102 may determine (1118) a direction of panning/zooming. For example, the device 102 may determine a first direction between first pixel coordinates associated with a first context point (e.g., a first video frame) and second pixel coordinates associated with a subsequent second context point (e.g., a second video frame). The device 102 may determine (1120) an area to include, determine (1122) dimensions of the area to include, determine (1124) a percentage of an output image for the area to include and determine (1126) a framing window. For example, the device 102 may determine an area to include based on pixels associated with the subject and interesting areas, may determine that dimensions of the area to include are 1000 pixels by 1000 pixels and may determine that the percentage of the output image for the area to include is 50% based on user preferences and/or a template. Thus, the device 102 may determine the framing window as 2000 pixels high by 3555 pixels wide (maintaining a 16:9 aspect ratio with the vertical dimension being the limiting factor) so that the area to include is displayed in 50% of the output image.

Figure 12:
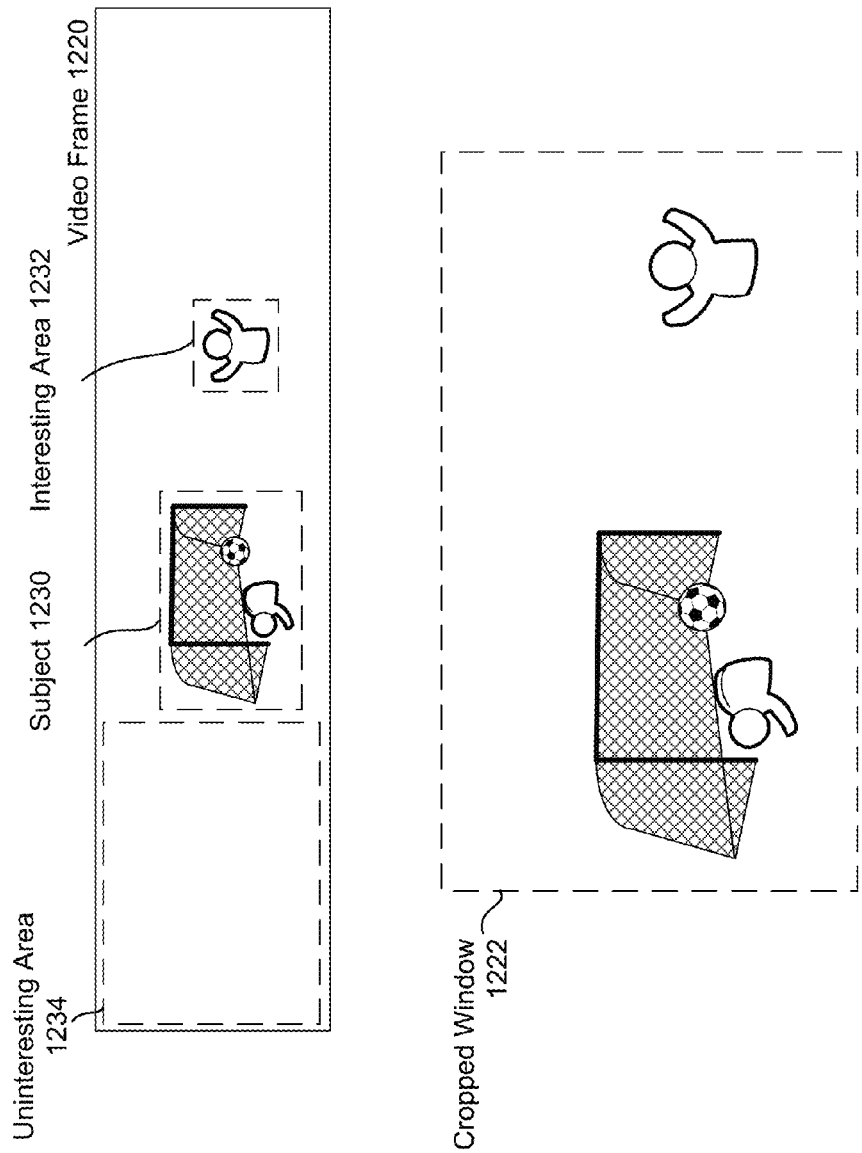
FIG. 12 illustrates an example of excluding an uninteresting area from a framing window according to embodiments of the present disclosure.

FIG. 12 illustrates an example of excluding an uninteresting area from a framing window according to embodiments of the present disclosure. As illustrated in FIG. 12, a video frame 1220 may include a subject 1230 (e.g., a scored goal), an interesting area 1232 (e.g., a celebrating player) and an uninteresting area 1234. For example, the device 102 may determine that the subject 1230 is the goal being scored based on the events discussed above with regard to FIGS. 9-10. After determining the subject 1230, the device 102 may identify content neighboring the subject and determine if the neighboring content is interesting or uninteresting. For example, the device 102 may identify that first neighboring content (e.g., area to the right of the subject 1230) is associated with the person 10 who scored the goal and may determine that the first neighboring content is the interesting area 1232. Similarly, the device 102 may identify that second neighboring content (e.g., area to the left of the subject 1230) is associated with static objects that have not moved during the event and may determine that the second neighboring content is the uninteresting area 1234. The device 102 may determine that content is neighboring the subject 1230 based on a number of pixels separating the content and the subject 1230 within the video data, based on a number of pixels separating the content and the subject 1230 within the video data and a size of the subject 1230 within the video data, an estimated distance between the content and the subject 1230 in during the event or the like. The camera angle and/or location capturing the video data may change, so the device 102 may determine if the neighboring content is static after adjusting for the change in camera angle and/or location. For example, the device 102 may identify visually distinct areas in the video data and may use the visually distinct areas as landmarks to determine changes in camera angle and/or location. Additionally or alternatively, the device 102 may track the interesting area 1232 and/or the uninteresting area 1234 as discussed above with regard to tracking an object.

In some examples, the device 102 may determine an interesting area in the video frame by determining content that is similar to content associated with a subject, object, event of interest or the like. Therefore, the device 102 may determine existing content (e.g., the content associated with the subject, object, event or the like) and may identify similar content as the interesting area, For example, if the device 102 is tracking a first player in a red jersey, the device 102 may analyze the video frame, identify a second player in a red jersey and may determine that the second player corresponds to the interesting area due to the similarity between the red jersey of the first player and the red jersey of the second player. Similarly, the device 102 may determine an uninteresting area in the video frame by determining content that is dissimilar to content associated with the subject, object, event of interest or the like. Therefore, the device 102 may determine existing content (e.g., the content associated with the subject, object, event or the like) and may identify dissimilar content as the uninteresting area, For example, if the device 102 is tracking a first player in a red jersey, the device 102 may analyze the video frame, identify a second player in a blue jersey and may determine that the second player corresponds to the uninteresting area due to the dissimilarity between the red jersey of the first player and the blue jersey of the second player. The system may use color histogram information to determine an interesting or uninteresting area (for example using players' jerseys). However, the above examples are intended merely as an illustration and the present disclosure is not limited thereto. Instead, the device 102 may identify attributes associated with the existing content, determine the interesting area due to shared attributes and determine the uninteresting area due to different attributes. For example, at a birthday party the device 102 may identify a first child as the object to track and may therefore determine that a second child corresponds to the interesting area while a first adult corresponds to an uninteresting area.

Additionally or alternatively, the device 102 may determine attributes associated with the interesting area or the uninteresting area from while using a template. For example, a golf template may identify that a person holding a golf club corresponds to the interesting area and that a group of spectators corresponds to the uninteresting area. In another example, a soccer template may identify that a scoreboard corresponds to the interesting area while a referee corresponds to the uninteresting area. Thus, the device 102 may identify static objects as corresponding to the interesting area and objects in motion corresponding to the uninteresting area without departing from the present disclosure.

After determining the interesting area 1232 and the uninteresting area 1234, the device 102 may determine the cropped window 1222. As illustrated in FIG. 12, the cropped window 1222 includes the subject 1230 and the interesting area 1232 and excludes the uninteresting area 1234. The cropped window 1222 may be evenly weighted between the subject 1230 and the interesting area 1232, although the disclosure is not limited thereto.

Figure 13:
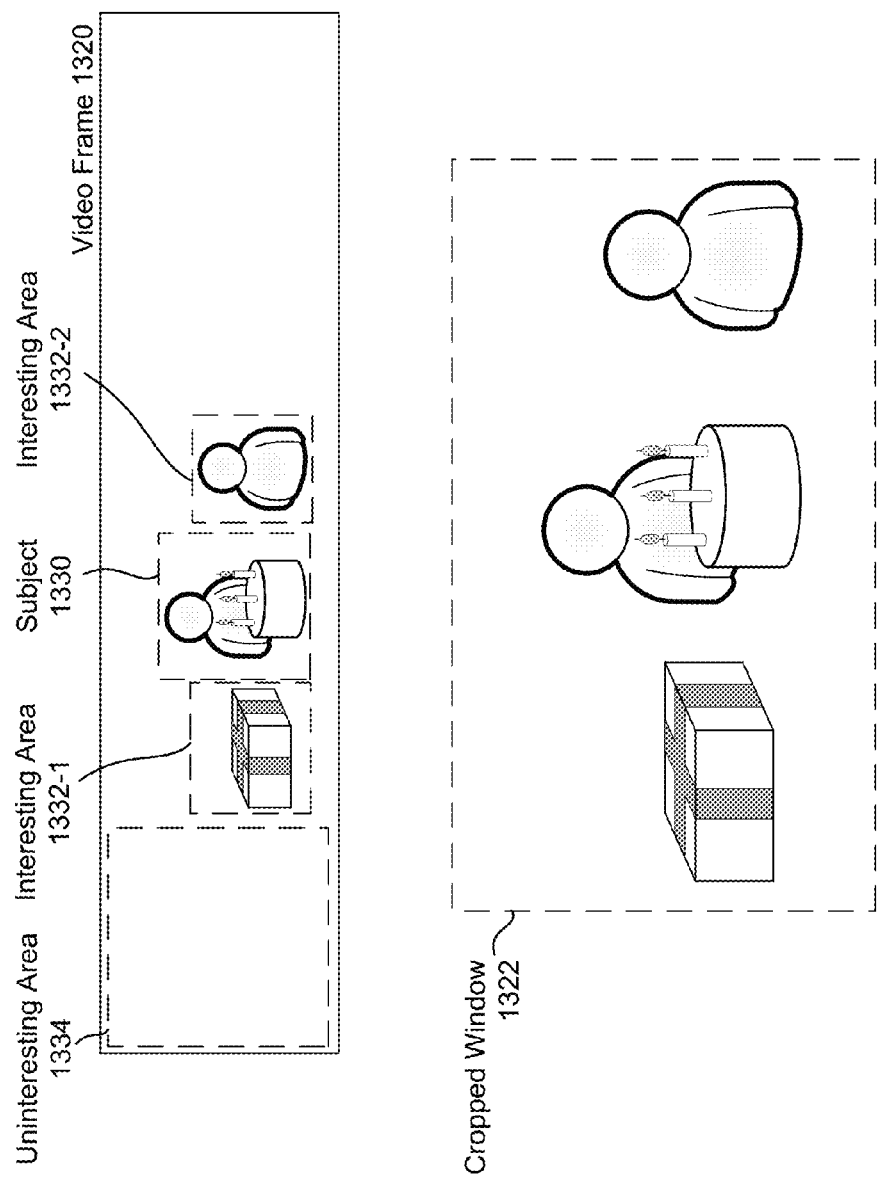
FIG. 13 illustrates an example of including interesting areas in a framing window according to embodiments of the present disclosure.

FIG. 13 illustrates an example of including interesting areas in a framing window according to embodiments of the present disclosure. As illustrated in FIG. 13, a video frame 1320 may include a subject 1330 (e.g., a birthday cake being blown out), a first interesting area 1332-1 (e.g., a birthday gift), a second interesting area 1332-2 (e.g., a party participant) and an uninteresting area 1334. For example, the device 102 may determine that the subject 1330 is the birthday cake being blown out based on the events discussed above with regard to FIGS. 8-10. After determining the subject 1330, the device 102 may identify content neighboring the subject and determine if the neighboring content is interesting or uninteresting. For example, the device 102 may identify that first neighboring content (e.g., area to the left of the subject 1330) is associated with the birthday gift and may determine that the first neighboring content is the first interesting area 1332-1. Similarly, the device 102 may identify that second neighboring content (e.g., area to the right of the subject 1330) is associated with the party participant and may determine that the second neighboring content is the second interesting area 1332-2. Finally, the device 102 may identify that third neighboring content (e.g., area to the left of the first interesting area 1332-1) is associated with static objects that have not moved during the event and are unrelated to the birthday cake and may therefore determine that the third neighboring content is the uninteresting area 1334.

After determining the first interesting area 1332-1, the second interesting area 1332-2 and the uninteresting area 1334, the device 102 may determine the cropped window 1322. As illustrated in FIG. 13, the cropped window 1322 includes the subject 1330, the first interesting area 1332-1 and the second interesting area 1332-2 and excludes the uninteresting area 1334. The cropped window 1322 may be center-weighted on the subject 1330, although the disclosure is not limited thereto.

Figure 14:
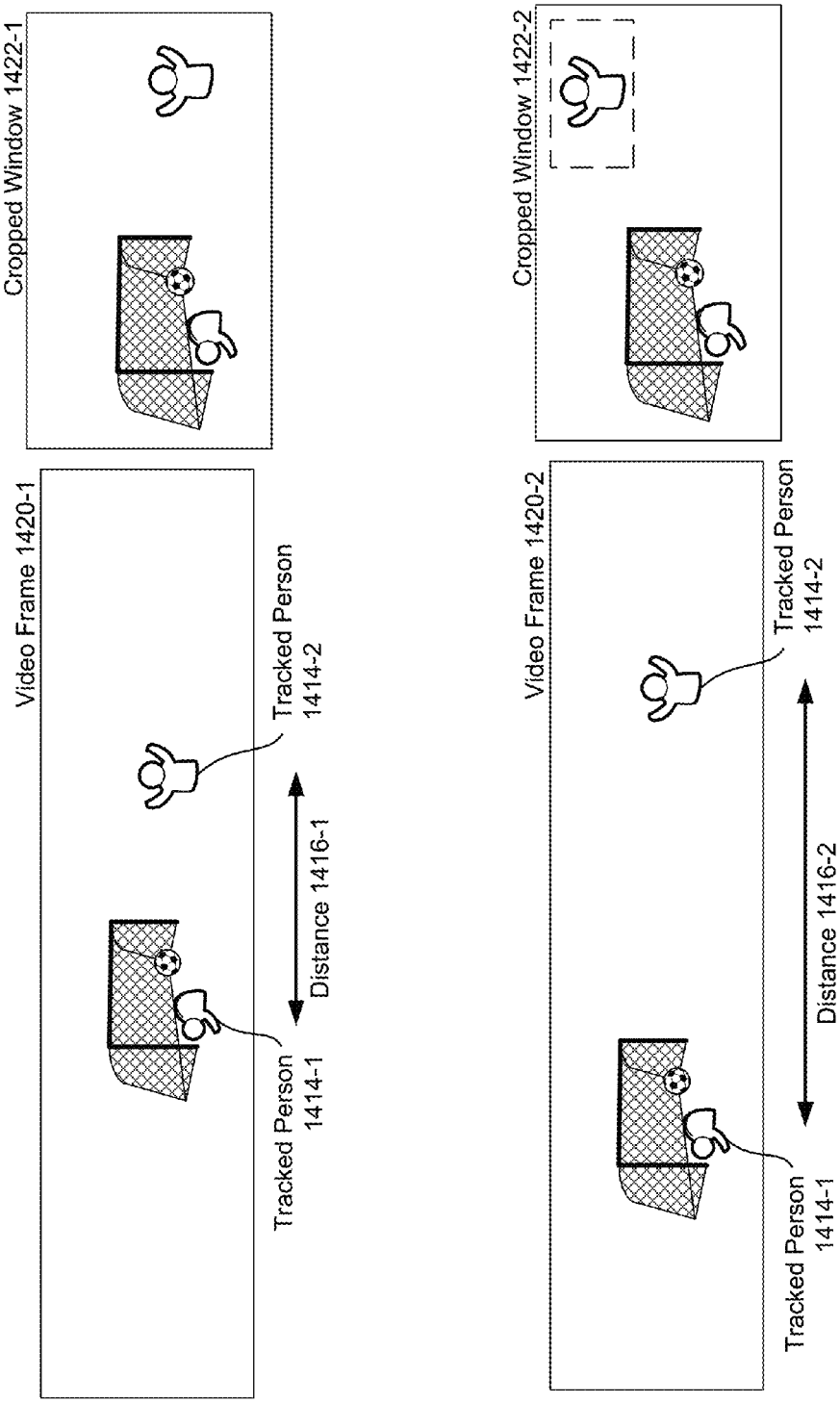
FIG. 14 illustrates examples of using picture in picture according to embodiments of the present disclosure.

FIG. 14 illustrates examples of using picture in picture according to embodiments of the present disclosure. As illustrated in FIG. 14, a first video frame 1420-1 may include a first tracked person 1414-1 and a second tracked person 1414-2 separated by a first distance 1416-1. As the first distance 1416-1 is below a threshold, the device 102 may determine a first cropped window 1422-1 including both the first tracked person 1414-1 and the second tracked person

1414-2. Thus, dimensions of the first cropped window 1422-1 may be selected based on a size of the first tracked person 1414-1 and the second tracked person 1414-2.

In contrast, a second video frame 1420-2 may include the first tracked person 1414-1 and the second tracked person 1414-2 separated by a second distance 1416-2. As the second distance 1416-2 exceeds the threshold, the device 102 may determine a second cropped window 1422-2 including one the tracked person 1414 in the second cropped window 1422-2 and the other tracked person 1414 present in a picture in picture (PiP) within the second cropped window 1422-2. Thus, as illustrated in FIG. 14, dimensions of the second cropped window 1422-2 may be selected based on a size of the first tracked person 1414-1 while the second tracked person 1414-2 may be included in the PiP.

Figure 15A:
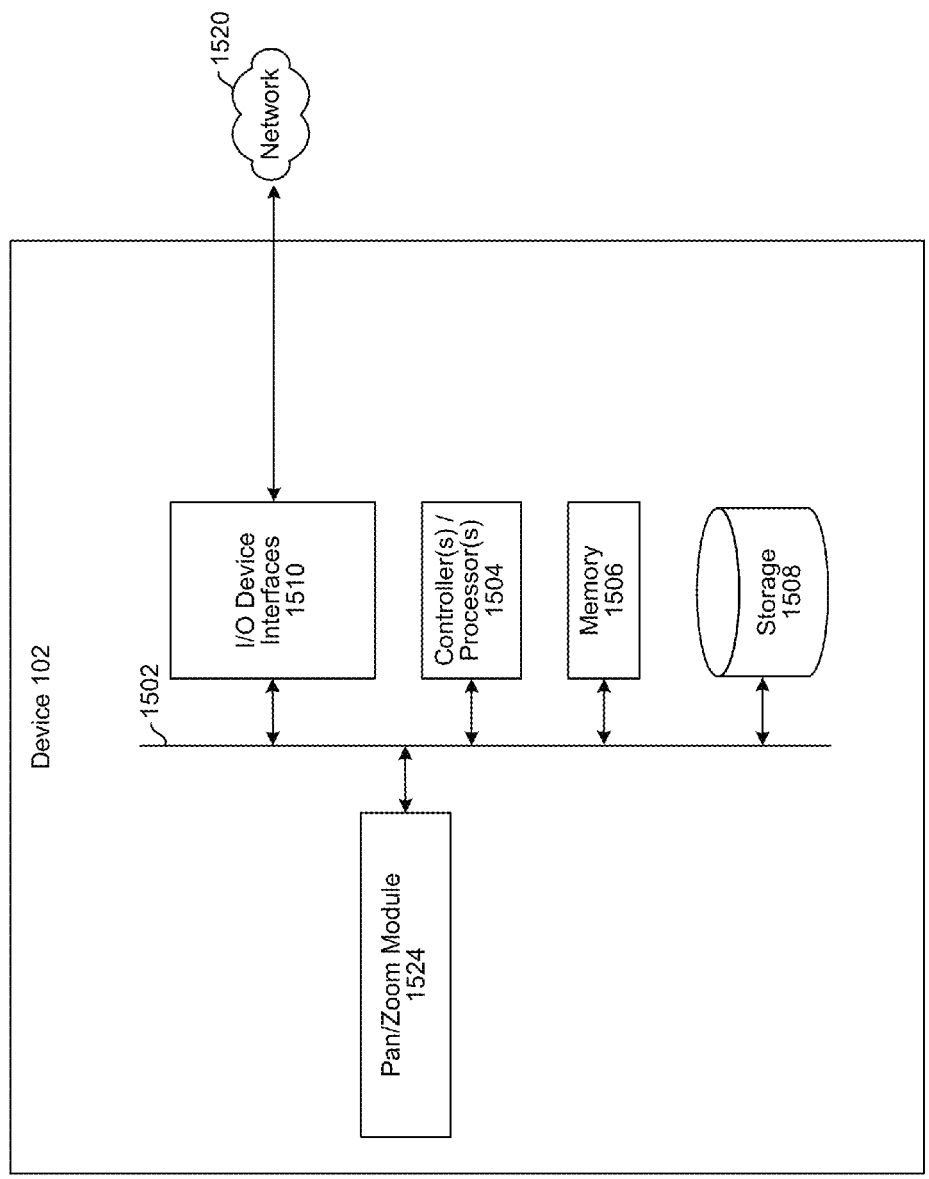
FIGS. 15A-15B are block diagrams conceptually illustrating example components of a system according to embodiments of the present disclosure.
Figure 15B:
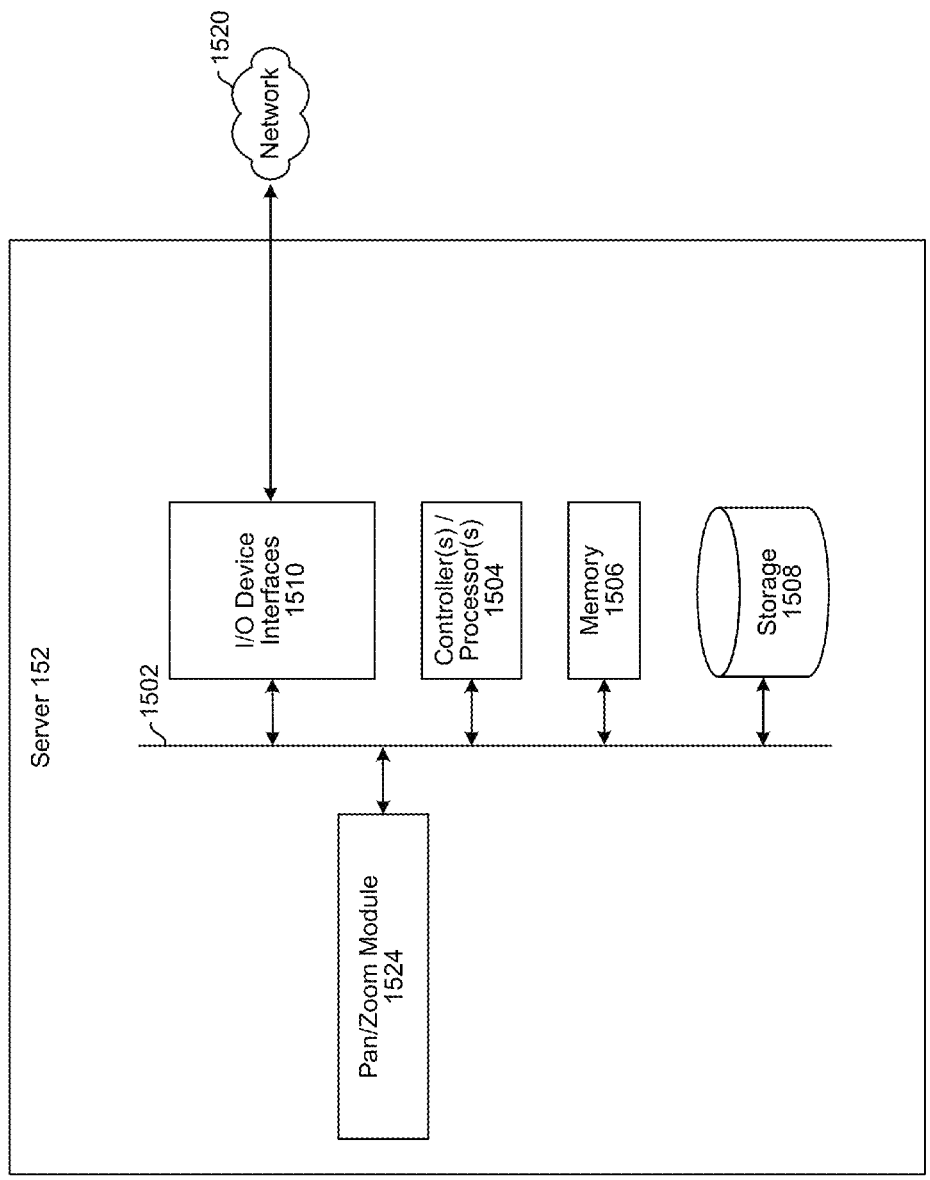

FIGS. 15A-15B illustrate block diagrams conceptually illustrating example components of a system 100 including one or more of a device 102 and a server 112. Depending upon how the system is structured, some of the components illustrated in FIG. 15A as part of the device 102 or in FIG. 15B as part of the server 112 may be included only in the device 102 or in the server 112, or may be distributed across multiple devices 102 and/or servers 112. Other components not illustrated may also be included in the device 102 and/or the server 112. In operation, the system 100 may include computer-readable and computer-executable instructions that reside in storage 1508 on the device 102/server 112. The device 102/server 112 may be an electronic device capable of performing facial recognition and/or speaker recognition. Examples of electronic devices may include computers (e.g., a desktop, a laptop, a server or the like), portable devices (e.g., a camera (such as a 360° video camera), smart phone, tablet or the like), media devices (e.g., televisions, video game consoles or the like) or the like. The device 102/server 112 may also be a component of any of the abovementioned devices or systems.

As illustrated in FIGS. 15A-15B, the device 102/server 112 may include an address/data bus 1502 for conveying data among components of the device 102. Each component within the device 102/server 112 may also be directly connected to other components in addition to (or instead of) being connected to other components across the bus 1502.

The device 102/server 112 may include one or more controllers/processors 1504 comprising one-or-more central processing units (CPUs) for processing data and computer-readable instructions and a memory 1506 for storing data and instructions. The memory 1506 may include volatile random access memory (RAM), non-volatile read only memory (ROM), non-volatile magnetoresistive (MRAM) and/or other types of memory. The device 102/server 112 may also include a data storage component 1508 for storing data and processor-executable instructions. The data storage component 1508 may include one or more non-volatile storage types such as magnetic storage, optical storage, solid-state storage, etc. The device 102/server 112 may also be connected to a removable or external non-volatile memory and/or storage (such as a removable memory card, memory key drive, networked storage, etc.) through the input/output device interfaces 1510.

The device 102/server 112 includes input/output device interfaces 1510. A variety of components may be connected to the device 102/server 112 through the input/output device interfaces 1510, such as camera(s) 104 and microphone(s) 106. However, the disclosure is not limited thereto and the device 102/server 112 may not include an integrated camera or microphone. Thus, the camera(s) 104, microphone(s) 106 and/or other components may be integrated into the device 102 or may be separate without departing from the disclosure.

The input/output device interfaces 1510 may be configured to operate with a network 1520, for example a wireless local area network (WLAN) (such as WiFi), Bluetooth, zigbee and/or wireless networks, such as a Long Term Evolution (LTE) network, WiMAX network, 3G network, etc. The network 1520 may include a local or private network or may include a wide network such as the internet. Devices may be connected to the network 1520 through either wired or wireless connections.

The input/output device interfaces 1510 may also include an interface for an external peripheral device connection such as universal serial bus (USB), FireWire, Thunderbolt, Ethernet port or other connection protocol that may connect to networks 1520. The input/output device interfaces 1510 may also include a connection to an antenna (not shown) to connect one or more networks 1520 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 102/server 112 further includes a pan/zoom module 1524, which may comprise processor-executable instructions stored in storage 1508 to be executed by controller(s)/processor(s) 1504 (e.g., software, firmware), hardware, or some combination thereof. For example, components of the pan/zoom module 1524 may be part of a software application running in the foreground and/or background on the device 102/server 112. The pan/zoom module 1524 may control the device 102/server 112 as discussed above, for example with regard to FIGS. 1, 7, and/or 11. Some or all of the controllers/modules of the pan/zoom module 1524 may be executable instructions that may be embedded in hardware or firmware in addition to, or instead of, software. In one embodiment, the device 102/server 112 may operate using an Android® operating system (such as Android® 4.3 Jelly Bean, Android® 4.4 KitKat or the like) or an Amazon® operating system (such as FireOS or the like).

Executable computer instructions for operating the device 102/server 112 and its various components may be executed by the controller(s)/processor(s) 1504, using the memory 1506 as temporary "working" storage at runtime. The executable instructions may be stored in a non-transitory manner in non-volatile memory 1506, storage 1508, or an external device. Alternatively, some or all of the executable instructions may be embedded in hardware or firmware in addition to or instead of software.

The components of the device(s) 102/server 112, as illustrated in FIGS. 15A-15B, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

Figure 16:
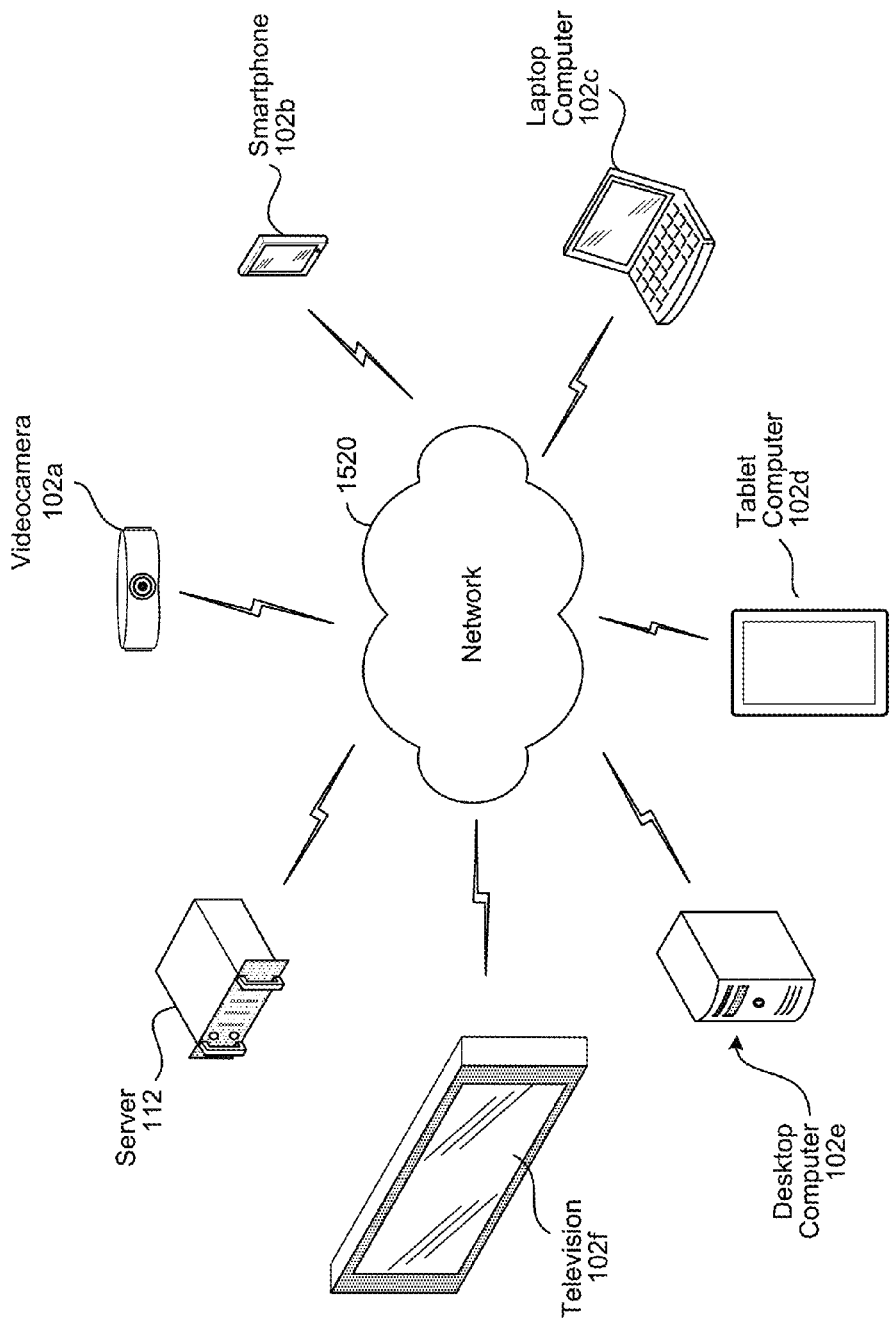
FIG. 16 illustrates an example of a computer network for use with the system.

As shown in FIG. 16, multiple devices may be connected over a network 1520. The network 1520 may include a local or private network or may include a wide network such as the internet. Devices may be connected to the network 1520 through either wired or wireless connections. For example, a smart phone 102b may be connected to the network 1520 through a wireless service provider. Other devices, such as a video camera 102a, laptop computer 102c, tablet computer 102d, desktop computer 102e, television 102f, and/or server 112, may connect to the network 1520 through a wired connection. The server 112 may be configured to receive, store, process and/or stream data related to image data and/or audio data associated with one or more of the video camera 102a, smartphone 102b, laptop computer 102c, tablet computer 102d, desktop computer 102e and television 102f, etc. For example, the server 112 may perform any of the steps described above with regard to FIGS. 1, 7, and/or 11. Alternatively, the server 112 may receive and store data generated by the video camera 102a, smartphone 102b, laptop computer 102c, tablet computer 102d, desktop computer 102e, television 102f, etc. using any of the steps described above. Thus, the sever 112 may process and output audio data, image data and/or video data to allow convenient access to any of the devices connected to the server 112.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method of simulating panning and zooming in video data, the method comprising:
   receiving panoramic video data comprising video frames having a first aspect ratio, the panoramic video data showing a plurality of directional views of a scene;
   identifying an object of interest represented in the panoramic video data;
   identifying an object within a first number of pixels of the object of interest in the first video frame;
   determining a beginning of an event of interest involving the object, the beginning corresponding to a first video frame of the panoramic video data, the first video frame showing a first directional view of the plurality of directional views;
   determining that the object does not move during the event of interest;
   identifying a person of interest within the first number of pixels of the object of interest in the first video frame;
   determining first pixel coordinates associated with the object in the first video frame, the first pixel coordinates including the object of interest and the person of interest;
   determining a first cropped window from the first video frame, the first cropped window comprising a portion of the first video frame including the first pixel coordinates, the first cropped window having a second aspect ratio less than the first aspect ratio and the first cropped window having a first size and a first position within the first video frame;
   determining an end of the event in a second video frame of the panoramic video data, the second video frame subsequent to the first video frame and the second video frame showing a second directional view of the plurality of directional views;
   determining second pixel coordinates associated with the object in the second video frame;

determining a second cropped window from the second video frame, the second cropped window comprising a portion of the second video frame including the second pixel coordinates and the second cropped window having a second size and a second position within the second video frame; and determining output video data including the first cropped window and the second cropped window.

2. The computer-implemented method of claim 1, further comprising:
determining the object is low priority;
determining the person of interest is high priority; and
determining, based at least in part on the high priority, that the first cropped window includes the person of interest.

3. The computer-implemented method of claim 1, wherein:
determining the second cropped window comprises determining the second position relative to the second video frame is different from the first position relative to the first video frame; and
determining output video data comprises determining output video data simulating panning from the first cropped window at the first position to the second cropped window at the second position.

4. The computer-implemented method of claim 1, wherein:
determining the second cropped window comprises determining the second size is different from the first size; and
determining output video data comprises determining output video data simulating zooming from the first cropped window having the first size to the second cropped window having the second size.

5. A computer-implemented method comprising:
receiving input video data comprising video frames;
identifying a first person represented in the video data;
identifying a second person represented in the video data;
determining, at a first time, that a first number of pixels between the first person and the second person in the video data exceeds a threshold;
determining, at a second time following the first time, that a second number of pixels between the first person and the second person in the video data is less than the threshold, wherein the second time is associated with a beginning of an event of interest;
determining first pixel coordinates in a first video frame associated with the beginning of the event;
determining a first cropped window from the first video frame, the first cropped window comprising a portion of the first video frame including the first pixel coordinates;
determining an end of the event in a second video frame of the video data;
determining second pixel coordinates in the second video frame associated with the end of the event, the second pixel coordinates different than the first pixel coordinates;
determining a second cropped window from the second video frame, the second cropped window comprising a portion of the second video frame including the second pixel coordinates; and
determining output data corresponding to the first cropped window and the second cropped window.

6. The computer-implemented method of claim 5, further comprising:
identifying an object of interest in the video data; and
tracking the object of interest across multiple video frames,
wherein, prior to determining the beginning of the event and determining the end of the event, the determining the event further comprises:
determining a third video frame corresponding to the event of interest based on the object of interest.

7. The computer-implemented method of claim 5, wherein determining the output data further comprises:
determining output video data simulating at least one of panning and zooming from the first cropped window to the second cropped window.

8. The computer-implemented method of claim 5, wherein determining the output data further comprises:
generating a first video tag corresponding to the first cropped window, the first video tag including the first pixel coordinates and a first timestamp associated with the first video frame; and
generating a second video tag corresponding to the second cropped window, the second video tag including the second pixel coordinates and a second timestamp associated with the second video frame.

9. The computer-implemented method of claim 5, further comprising:
determining a first direction between the first pixel coordinates and the second pixel coordinates,
wherein the determining the first cropped window further comprises:
determining the first cropped window, the first cropped window comprising a portion of the first image including the first pixel coordinates and an area of pixels in the first direction from the first pixel coordinates.

10. The computer-implemented method of claim 5, wherein:
determining the second cropped window comprises determining a second position relative to the second video frame is different from a first position relative to the first video frame; and
determining output video data comprises determining output video data simulating panning from the first cropped window at the first position to the second cropped window at the second position.

11. The computer-implemented method of claim 5, wherein:
determining the second cropped window comprises determining a second size of the second cropped window is different from a first size of the first cropped window; and
determining output video data comprises determining output video data simulating zooming from the first cropped window to the second cropped window.

12. The computer-implemented method of claim 5, wherein:
the video frames have a first aspect ratio greater than 2:1,
the first cropped window has a second aspect ratio less than 2:1, a first size, and a first position within the first video frame, and
the second cropped window has the second aspect ratio, a second size, and a second position within the second video frame.

13. A system, comprising:
at least one processor;
a memory including instructions that, when executed by the at least one processor, cause the system to perform a set of actions comprising:
receiving input video data comprising video frames;
identifying a first person represented in the video data;

identifying a second person represented in the video data;
determining, at a first time, that a first number of pixels between the first person and the second person in the video data exceeds a threshold;
determining, at a second time following the first time, that a second number of pixels between the first person and the second person in the video data is less than the threshold, wherein the second time is associated with a beginning of an event of interest;
determining first pixel coordinates in a first video frame associated with the beginning of the event;
determining a first cropped window from the first video frame, the first cropped window comprising a portion of the first video frame including the first pixel coordinates;
determining an end of the event in a second video frame of the video data;
determining second pixel coordinates in the second video frame associated with the end of the event, the second pixel coordinates different than the first pixel coordinates;
determining a second cropped window from the second video frame, the second cropped window comprising a portion of the second video frame including the second pixel coordinates; and
determining output data corresponding to the first cropped window and the second cropped window.

14. The system of claim 12, the set of actions further comprising:
identifying an object of interest in the video data;
tracking the object of interest across multiple video frames; and
determining, prior to determining the beginning of the event and determining the end of the event, a third video frame corresponding to the event of interest based on the object of interest.

15. The system of claim 14, the set of actions further comprising:
determining a first color histogram corresponding to the object;
determining a second color histogram corresponding to third video frame; and
comparing the first color histogram with the second color histogram.

16. The system of claim 12, the set of actions further comprising:
generating a first video tag corresponding to the first cropped window, the first video tag including the first pixel coordinates and a first timestamp associated with the first video frame; and
generating a second video tag corresponding to the second cropped window, the second video tag including the second pixel coordinates and a second timestamp associated with the second video frame.

17. The system of claim 12, the set of actions further comprising:
determining a first direction between the first pixel coordinates and the second pixel coordinates; and
determining the first cropped window, the first cropped window comprising a portion of the first image including the first pixel coordinates and an area of pixels in the first direction from the first pixel coordinates.

18. The system of claim 12, the set of actions further comprising:
determining the second cropped window comprises determining the second position relative to the second video frame is different from the first position relative to the first video frame; and
determining output video data comprises determining output video data simulating panning from the first cropped window at the first position to the second cropped window at the second position.

19. The system of claim 12, the set of actions further comprising:
determining the second cropped window comprises determining a second size of the second cropped window is different from a first size of the first cropped window; and
determining output video data comprises determining output video data simulating zooming from the first cropped window to the second cropped window.

20. The system of claim 12, wherein:
the video frames have a first aspect ratio greater than 2:1,
the first cropped window has a second aspect ratio less than 2:1, a first size, and a first position within the first video frame, and
the second cropped window has the second aspect ratio, a second size, and a second position within the second video frame.

* * * * *